US010306214B2

(12) United States Patent
Ohashi

(10) Patent No.: US 10,306,214 B2
(45) Date of Patent: May 28, 2019

(54) STEREOSCOPIC IMAGE PRESENTING DEVICE, STEREOSCOPIC IMAGE PRESENTING METHOD, AND HEAD-MOUNTED DISPLAY

(71) Applicant: Sony Interactive Entertainment Inc., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 60 days.

(21) Appl. No.: 15/325,167

(22) PCT Filed: Jul. 10, 2015

(86) PCT No.: PCT/JP2015/069942
§ 371 (c)(1),
(2) Date: Jan. 10, 2017

(87) PCT Pub. No.: WO2016/009970
PCT Pub. Date: Jan. 21, 2016

(65) Prior Publication Data
US 2017/0180712 A1 Jun. 22, 2017

(30) Foreign Application Priority Data

Jul. 17, 2014 (JP) ................................. 2014-147055

(51) Int. Cl.
*H04N 13/344* (2018.01)
*G02B 27/02* (2006.01)
(Continued)

(52) U.S. Cl.
CPC ........... *H04N 13/344* (2018.05); *G02B 27/02* (2013.01); *G02B 27/22* (2013.01); *G06T 15/205* (2013.01);
(Continued)

(58) Field of Classification Search
CPC .. H04N 13/366; H04N 13/395; H04N 21/816; G02B 27/2292
(Continued)

(56) References Cited

U.S. PATENT DOCUMENTS 6,177,952 B1 * 1/2001 Tabata ................. G02B 27/017
  348/47
6,570,566 B1 * 5/2003 Yoshigahara ........... G06T 15/10
  345/427
(Continued)

FOREIGN PATENT DOCUMENTS

| CN | 1739303 A | 2/2006 |
| CN | 102413339 A | 4/2012 |

(Continued)

OTHER PUBLICATIONS

International Search Report for corresponding PCT Application No. PCT/JP2015/069942, 4 pages, dated Oct. 5, 2016.
(Continued)

*Primary Examiner* — Marnie A Matt
(74) *Attorney, Agent, or Firm* — Matthew B. Dernier, Esq.

(57) ABSTRACT

In a stereoscopic image presenting device, an image obtaining portion obtains an image to be presented. An image presenting portion presents a virtual image of the image obtained by the image obtaining portion to a field of view of a user of the stereoscopic image presenting device. The image presenting portion is configured to be able to change the position of the virtual image presented to the user, and changes the position at which the virtual image is presented on the basis of depth information of an object appearing in the image.

10 Claims, 14 Drawing Sheets

(51) Int. Cl.
*G02B 27/22* (2018.01)
*G09G 3/20* (2006.01)
*G09G 5/00* (2006.01)
*G09G 5/36* (2006.01)
*H04N 13/00* (2018.01)
*H04N 13/128* (2018.01)
*G06T 15/20* (2011.01)
*H04N 13/395* (2018.01)

(52) U.S. Cl.
CPC ............ *G09G 3/20* (2013.01); *G09G 5/00* (2013.01); *G09G 5/36* (2013.01); *H04N 13/00* (2013.01); *H04N 13/128* (2018.05); *H04N 13/395* (2018.05)

(58) Field of Classification Search
USPC .......................................................... 348/53
See application file for complete search history.

(56) References Cited

U.S. PATENT DOCUMENTS

| | | | |
|---|---|---|---|
| 7,403,201 B2 | 7/2008 | Takemoto | |
| 8,743,112 B2 | 6/2014 | Jang | |
| 9,557,566 B2 | 1/2017 | Fujimaki | |
| 10,101,585 B2 | 10/2018 | Ueno | |
| 2006/0050383 A1* | 3/2006 | Takemoto | H04N 13/194 359/462 |
| 2006/0273983 A1* | 12/2006 | Koo | G02B 27/2278 345/6 |
| 2009/0066786 A1 | 3/2009 | Landa | |
| 2009/0133170 A1* | 5/2009 | Rolland | G02B 26/105 850/56 |
| 2009/0180195 A1* | 7/2009 | Cakmakci | G02B 27/0172 359/631 |
| 2010/0182340 A1* | 7/2010 | Bachelder | G02B 27/017 345/633 |
| 2011/0304710 A1* | 12/2011 | Ito | A63F 13/65 348/51 |
| 2011/0304711 A1* | 12/2011 | Ito | A63F 13/65 348/51 |
| 2012/0069143 A1 | 3/2012 | Chu | |
| 2012/0113107 A1 | 5/2012 | Jang | |
| 2012/0127284 A1* | 5/2012 | Bar-Zeev | G02B 27/017 348/53 |
| 2012/0147038 A1* | 6/2012 | Perez | G02B 27/0172 345/632 |
| 2013/0234914 A1 | 9/2013 | Fujimaki | |
| 2014/0184758 A1 | 7/2014 | Lee | |
| 2014/0192281 A1 | 7/2014 | Smithwick | |
| 2015/0260990 A1* | 9/2015 | Ueno | G02B 27/017 345/419 |
| 2016/0033770 A1* | 2/2016 | Fujimaki | G06T 19/006 345/8 |
| 2016/0042554 A1* | 2/2016 | Ogan | G02B 27/2278 345/419 |
| 2017/0150136 A1* | 5/2017 | Ueno | G02B 27/017 |

FOREIGN PATENT DOCUMENTS

| | | | | |
|---|---|---|---|---|
| CN | 102457755 A | 5/2012 | | |
| CN | 103309034 A | 9/2013 | | |
| CN | 103873841 A | 6/2014 | | |
| EP | 1587329 A1 | 10/2005 | | |
| EP | 2432229 A2 | 3/2012 | | |
| JP | 07111664 A | 4/1995 | | |
| JP | 09331552 A | 12/1997 | | |
| JP | 2009500878 A | 1/2009 | | |
| JP | WO 2014156033 A1 * | 10/2014 | ........... | G06T 19/006 |
| WO | 2004071102 A1 | 8/2004 | | |
| WO | 2006109252 A2 | 10/2006 | | |
| WO | 2014024649 A1 | 2/2014 | | |
| WO | 2014050959 A1 | 4/2014 | | |
| WO | WO-2014156033 A1 * | 10/2014 | | |

OTHER PUBLICATIONS

International Preliminary Report on Patentability and Written Opinion for corresponding PCT Application No. PCT/JP2015/069942, 18 pages, dated Nov. 17, 2016.
Office Action for corresponding CN Application No. 201580037801. 8, 19 pages, dated Dec. 6, 2017.
Extended European Search Report for corresponding EP Application No. 15821846, 15 pages, dated Jan. 25, 2018.
Rolland J P, et al: "Dynamic Focusing in Head-Mounted Displays", Visual Communications and Image Processing; Jan. 20, 2004-Jan. 20, 2004; San Jose,vol. 3639, pp. 463-470, (Jan. 25, 1999).
Office Action for corresponding JP Application No. 2014147055, 8 pages, dated Dec. 12, 2017.
Office Action for corresponding EP Application No. EP15821846.1, 6 pages, dated Feb. 5, 2019.

* cited by examiner

F I G. 2
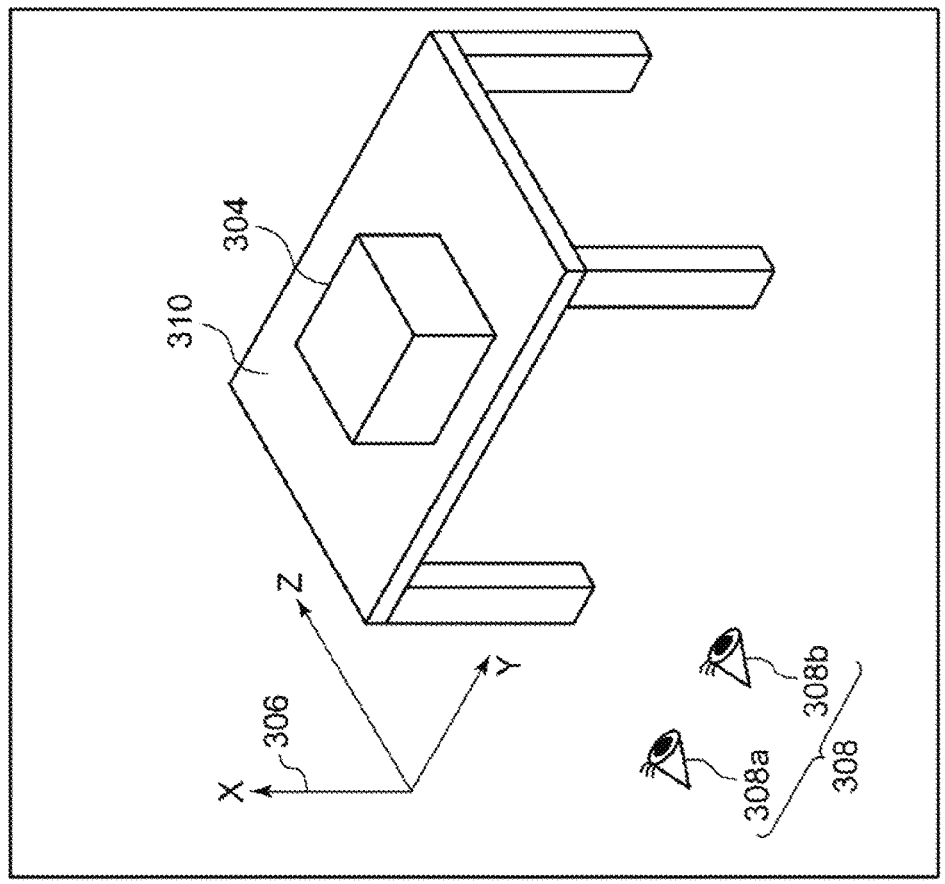
(b)
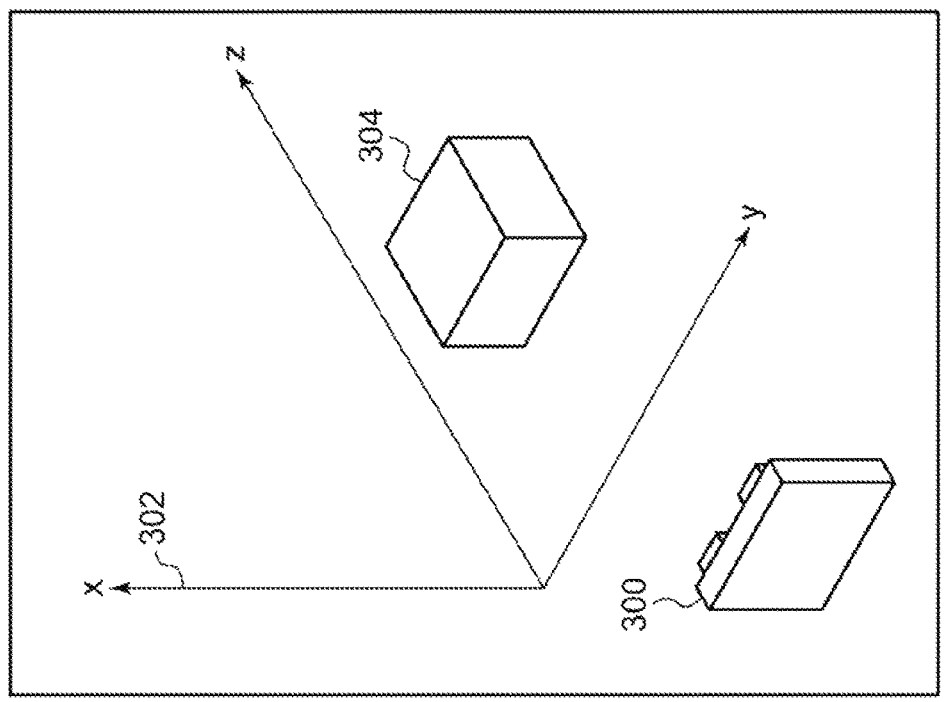
(a)

(a)　　　　　　　(b)

FIG. 12
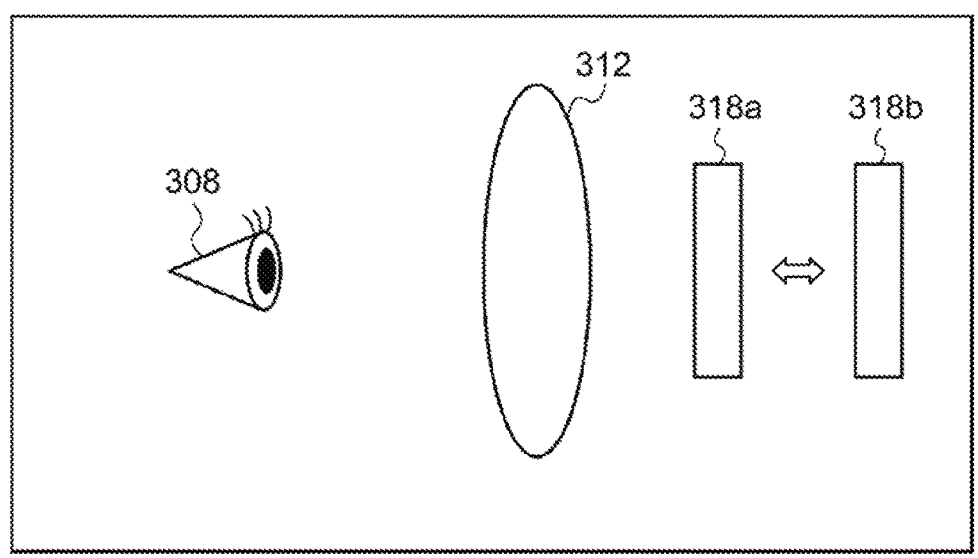
(b)
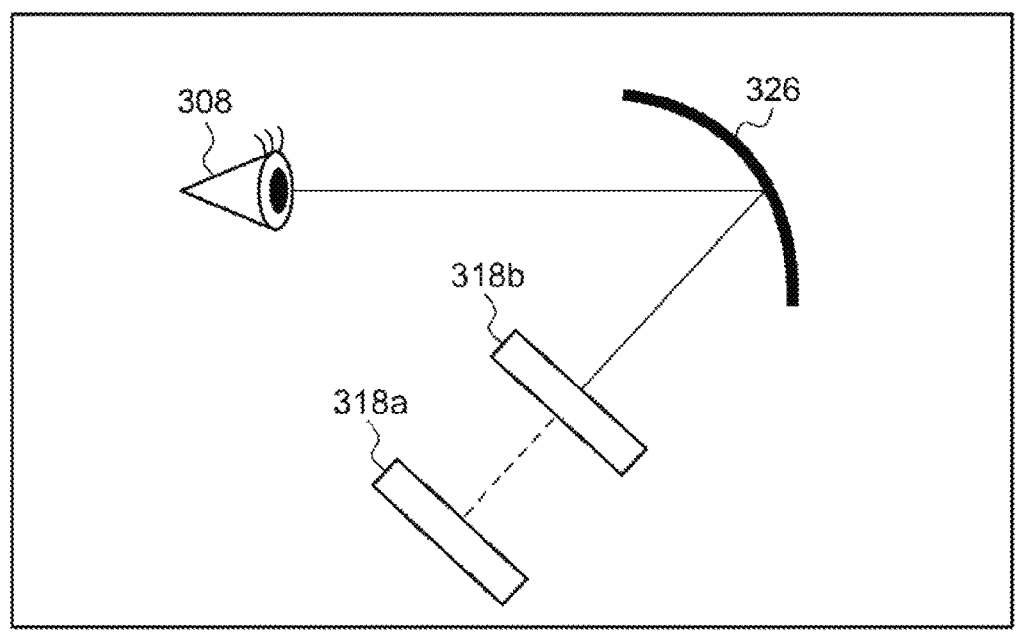
(b)

F I G. 13
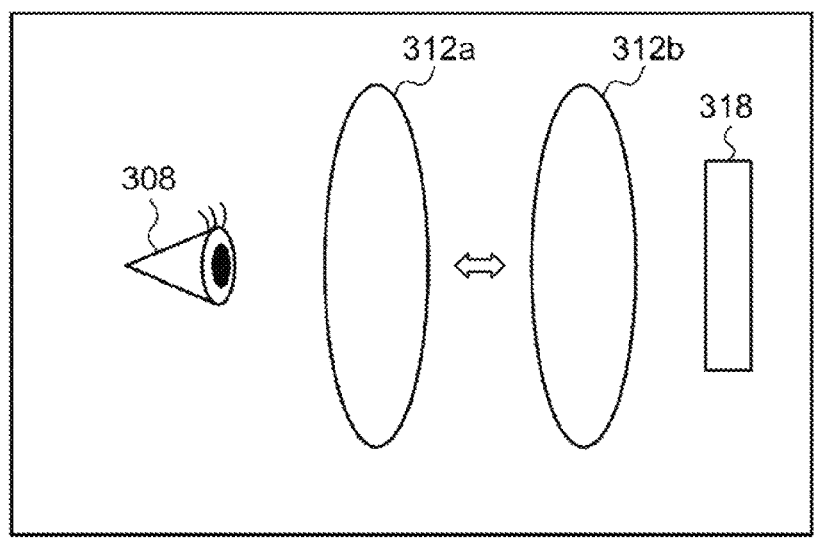
(a)
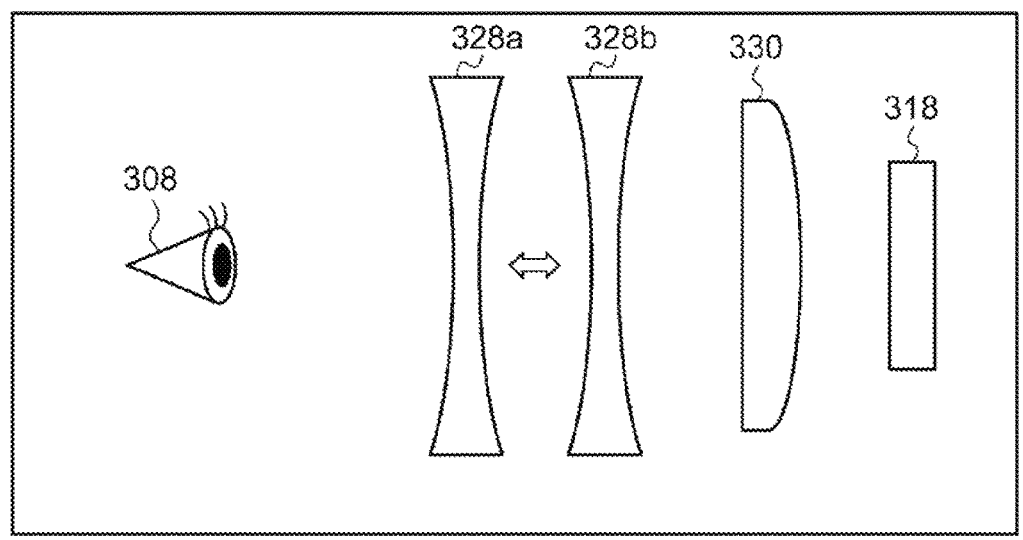
(b)

FIG. 14
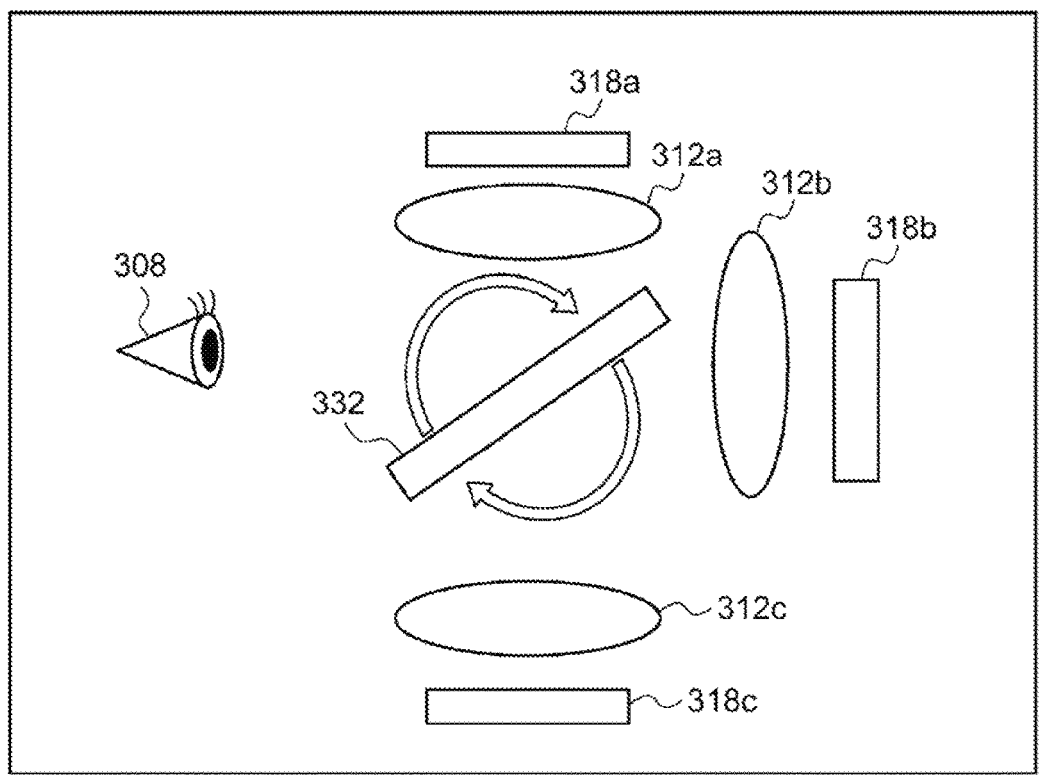
(a)
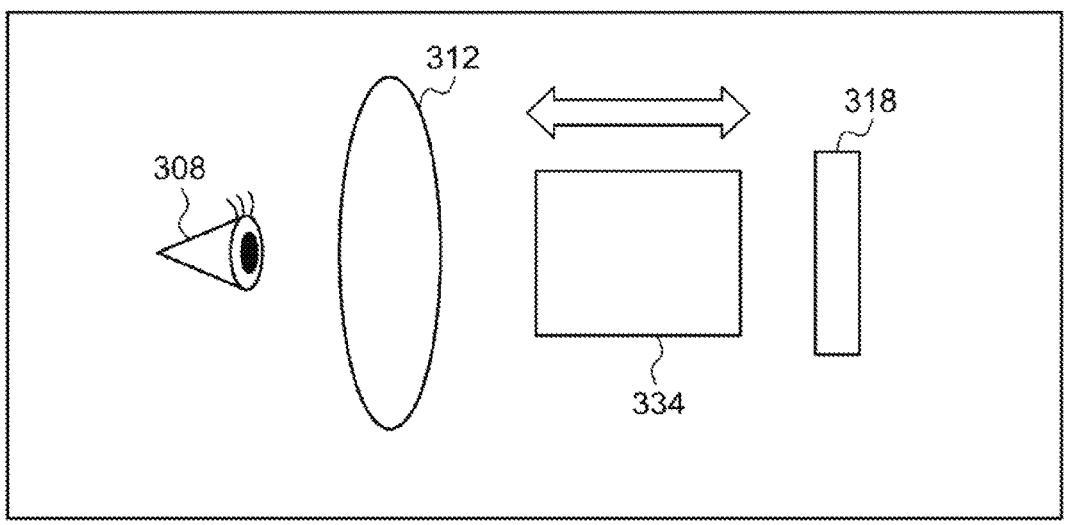
(b)

1

STEREOSCOPIC IMAGE PRESENTING DEVICE, STEREOSCOPIC IMAGE PRESENTING METHOD, AND HEAD-MOUNTED DISPLAY

TECHNICAL FIELD

The present invention relates to a stereoscopic image presenting device, a stereoscopic image presenting method, and a head-mounted display.

BACKGROUND ART

Recently, the development of a technology for presenting a stereoscopic video has advanced, and head-mounted displays (hereinafter described as "HMDs") capable of presenting stereoscopic video having depth have spread. Such HMDs include a shielded HMD that completely covers and shields a field of view of a user wearing the HMD and which can therefore provide a deep sense of immersion to the user observing video. An optical see-through HMD has also been developed as another kind of HMD. The optical see-through HMD is a stereoscopic image device that, using a holographic element, a half-silvered mirror, or the like, can present an augmented reality (AR) image, which is virtual stereoscopic video, to the user, and present a state of a real space outside the HMD to the user in a see-through manner.

SUMMARY

Technical Problems

These HMDs are devices for presenting stereoscopic video to a user. There is a desire to reduce a feeling of visual strangeness given to a user wearing an HMD and enhance the stereoscopic effect of stereoscopic video presented by the HMD to give a deeper sense of immersion. In addition, when an optical see-through HMD presents an AR image, the AR image is displayed in such a manner as to be superimposed on a real space. Therefore, when a three-dimensional object in particular is presented as an AR image, it is desirable that, to the user of the optical see-through HMD, the AR image appear to be harmonized with objects in the real space without causing a feeling of strangeness. There is thus a desire for a technology that improves the stereoscopic effect of the AR image.

It is an object of the present invention to provide a technology that improves the stereoscopic effect of an image presented by a stereoscopic image presenting device.

Solution to Problems

In order to solve the above problems, according to a mode of the present invention, there is provided a stereoscopic image presenting device including an image obtaining portion configured to obtain an image to be presented, and an image presenting portion configured to present a virtual image of the image obtained by the image obtaining portion to a field of view of a user of the stereoscopic image presenting device. The image presenting portion is configured to be able to change a position of the virtual image presented to the user, and changes the position at which the virtual image is presented on a basis of depth information of an object appearing in the image.

Another mode of the present invention is an image presenting method performed by a processor of a stereoscopic image presenting device. This method includes a step of obtaining an image of an object to be presented, a step of setting a position at which to present a virtual image of the image on a basis of depth information of the object, and a step of presenting the virtual image at the set position.

Yet another mode of the present invention is a head-mounted display for presenting a stereoscopic image. This head-mounted display includes an image obtaining portion configured to obtain an image to be presented, and an image presenting portion configured to present a virtual image of the image obtained by the image obtaining portion to a user wearing the head-mounted display. The image presenting portion includes a plurality of transmissive display sections configured to display the image, and an optical element configured to generate the virtual image of the image displayed by each of the plurality of transmissive display sections. The plurality of transmissive display sections are provided side by side on an optical path of the image presenting portion, and the optical element is provided between an eye of the user and the plurality of transmissive display sections in the optical path of the image presenting portion.

Yet another mode of the present invention is a program for making a computer realize each step of the above-described method.

This program may for example be provided as a part of firmware incorporated in an apparatus for performing basic control of hardware resources such as a computer included in an HMD. This firmware is for example stored in a semiconductor memory such as a read only memory (ROM), or a flash memory within the apparatus. In order to provide this firmware, or in order to update a part of the firmware, a computer readable recording medium on which the program is recorded may be provided, and the program may be transmitted by a communication line.

It is to be noted that arbitrary combinations of the above constituent elements as well as modes obtained by converting expressions of the present invention between a method, a device, a system, a computer program, a data structure, a recording medium, and the like are also effective as modes of the present invention.

Advantageous Effect of Invention

According to the present invention, it is possible to improve the stereoscopic effect of an image presented by a stereoscopic image presenting device.

BRIEF DESCRIPTION OF DRAWINGS

FIGS. 2(a) and 2(b) are diagrams schematically showing relation between an object in a virtual three-dimensional space and the object superimposed on a real space.

FIGS. 12(a) and 12(b) are diagrams schematically showing an optical system of a stereoscopic image presenting device according to a second modification.

FIGS. 13(a) and 13(b) are diagrams schematically showing an optical system of a stereoscopic image presenting device according to a third modification.

FIGS. 14(a) and 14(b) are diagrams schematically showing an optical system of a stereoscopic image presenting device according to a fourth modification.

DESCRIPTION OF EMBODIMENT

A mode for carrying out the present invention will hereinafter be described in detail with reference to the drawings. Incidentally, in the description, identical elements are identified by the same reference symbols, and repeated description thereof will be omitted as appropriate. In addition, configurations to be described in the following are illustrative, and do not at all limit the scope of the present invention.

Figure 1:
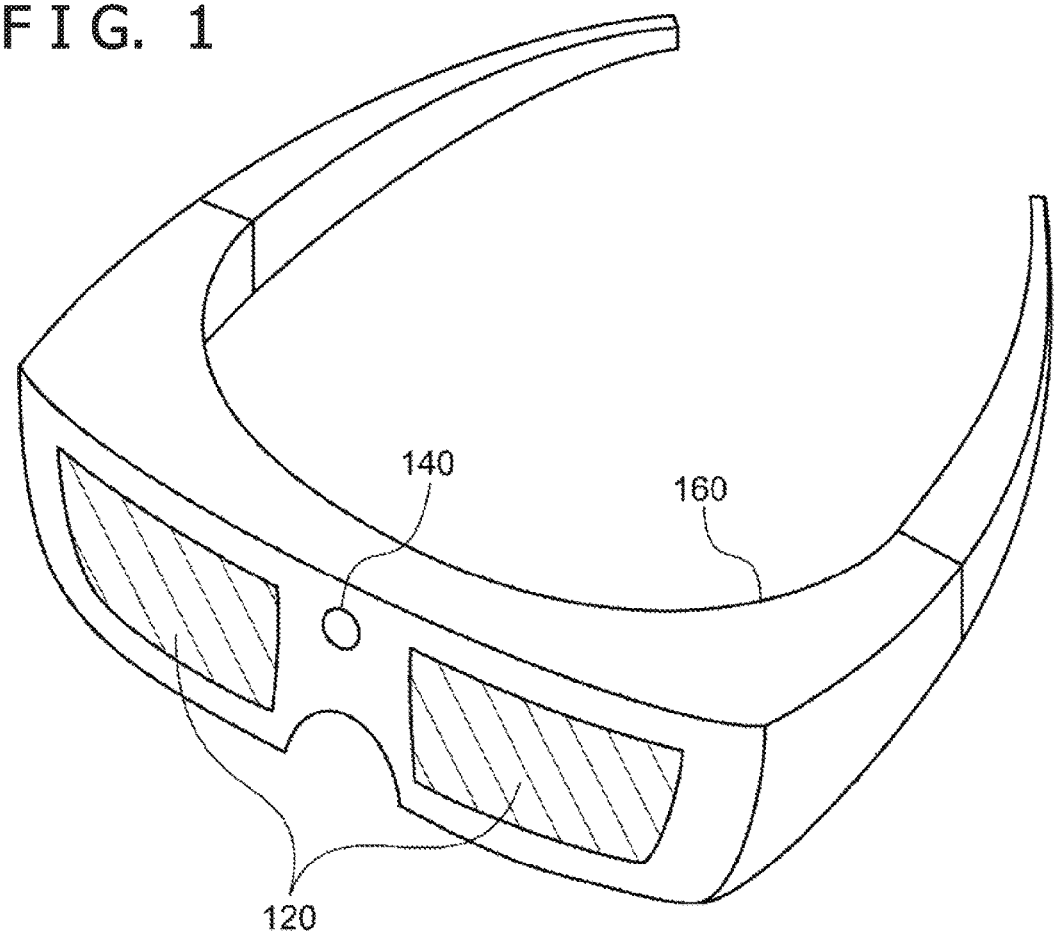
FIG. 1 is a diagram schematically showing an example of an external appearance of an HMD according to an embodiment.

FIG. 1 is a diagram schematically showing an example of an external appearance of a stereoscopic image presenting device 100 according to an embodiment. The stereoscopic image presenting device 100 can be implemented by a shielded HMD or an optical see-through HMD, for example. The stereoscopic image presenting device 100 includes a casing 160 housing a presenting section 120, an imaging element 140, and various modules. In the present specification, the stereoscopic image presenting device 100 will hereinafter be described simply as an HMD unless a kind of HMD, such as a shielded HMD, or an optical see-through HMD is to be particularly distinguished. Hence, the HMD includes shielded HMDs and optical see-through HMDs.

The presenting section 120 presents stereoscopic video to eyes of a user. More specifically, the presenting section 120 individually presents a parallax image for a left eye and a parallax image for a right eye to the eyes of the user. The presenting section 120 can thereby present stereoscopic video providing a sense of depth to the user. The imaging element 140 images a subject present in a region including a field of view of the user wearing the stereoscopic image presenting device 100. Therefore, the imaging element 140 is installed so as to be disposed around the middle of the forehead of the user when the user wears the stereoscopic image presenting device 100. The imaging element 140 can be implemented by using a known solid-state imaging element such as a charge coupled device (CCD) image sensor, a complementary metal oxide semiconductor (CMOS) image sensor, for example.

The casing 160 plays a role of a frame in the stereoscopic image presenting device 100, and houses various modules (not shown) used by the stereoscopic image presenting device 100. The modules used by the stereoscopic image presenting device 100 are optical parts including a holographic light guide plate, and motors for changing the positions of these optical parts, as well as a communication module such as a Wi-Fi (registered trademark) module, an electronic compass, an acceleration sensor, an inclination sensor, a global positioning system (GPS) sensor, an illuminance sensor, a central processing unit (CPU) for controlling and operating these parts, a memory serving as a work area of the CPU, and the like. These modules are illustrative, and the stereoscopic image presenting device 100 does not necessarily need to include all of these modules. It suffices to determine which modules to include according to a usage scene assumed by the stereoscopic image presenting device 100.

FIG. 1 is a diagram showing an example in which an HMD of an eyeglass type is used as the stereoscopic image presenting device 100. Various other variations of the shape of the stereoscopic image presenting device 100 are conceivable, such as a headgear shape, a belt shape put around the head of the user and fixed, and a helmet shape covering the whole of the head of the user. It should be readily understood by those skilled in the art that stereoscopic image presenting devices 100 of any shape are included in the embodiment of the present invention.

Principles that improve a stereoscopic effect of an image presented by the stereoscopic image presenting device 100 according to the embodiment will be described in the following with reference to FIGS. 2 to 5. The following description will be made of a case where the stereoscopic image presenting device 100 displays an AR image in such a manner as to be superimposed on a real space. However, the image presented by the stereoscopic image presenting device 100 is not limited to an AR image, but is applicable also as stereoscopic video including a parallax image for the left eye and a parallax image for the right eye, such as a three-dimensional (3D) movie, for example. The latter case will be described later as an eighth modification of the embodiment.

FIGS. 2(a) and 2(b) are diagrams schematically showing relation between an object in a virtual three-dimensional space and the object superimposed on the real space.

FIG. 2(a) is a diagram showing a state in which a virtual camera (hereinafter described as a "virtual camera 300") set in the virtual three-dimensional space (hereinafter described as a "virtual space") is photographing a virtual object (hereinafter described as a "virtual object 304"). A virtual three-dimensional orthogonal coordinate system (hereinafter described as a "virtual coordinate system 302") for defining the position coordinates of the virtual object 304 is set in the virtual space.

The virtual camera 300 is a virtual binocular camera. The virtual camera 300 generates a parallax image for the left eye of the user and a parallax image for the right eye of the user. An image of the virtual object 304 photographed from the virtual camera 300 changes according to a distance from the virtual camera 300 to the virtual object 304 in the virtual space.

FIG. 2(b) is a diagram showing a state in which the image of the virtual object 304 as viewed from the virtual camera 300 in the virtual space is displayed in such a manner as to be superimposed on the real space. A desk 310 in FIG. 2(b) is a desk as a real thing present in the real space. When the user wearing the stereoscopic image presenting device 100 observes the desk 310 with a left eye 308a and a right eye 308b, the user observes as if the virtual object 304 were placed on the desk 310. The image thus displayed in such a manner as to be superimposed on the real thing present in the real space is an AR image. Hereinafter, in the present specification, the left eye 308a and the right eye 308b of the user will be described simply as a "viewpoint 308" unless particularly distinguished from each other.

As in the virtual space, a three-dimensional orthogonal coordinate system for defining the position coordinates of the virtual object 304 is set also in the real space (the three-dimensional orthogonal coordinate system will hereinafter be described as a "real coordinate system 306"). The stereoscopic image presenting device 100 refers to the virtual coordinate system 302 and the real coordinate system 306, and changes the presentation position of the virtual object 304 in the real space according to the distance from the virtual camera 300 to the virtual object 304 in the virtual space. More specifically, the stereoscopic image presenting device 100 disposes a virtual image of the virtual object 304 at a position more distant from the viewpoint 308 in the real space as the distance from the virtual camera 300 to the virtual object 304 in the virtual space becomes longer.

Figure 3:
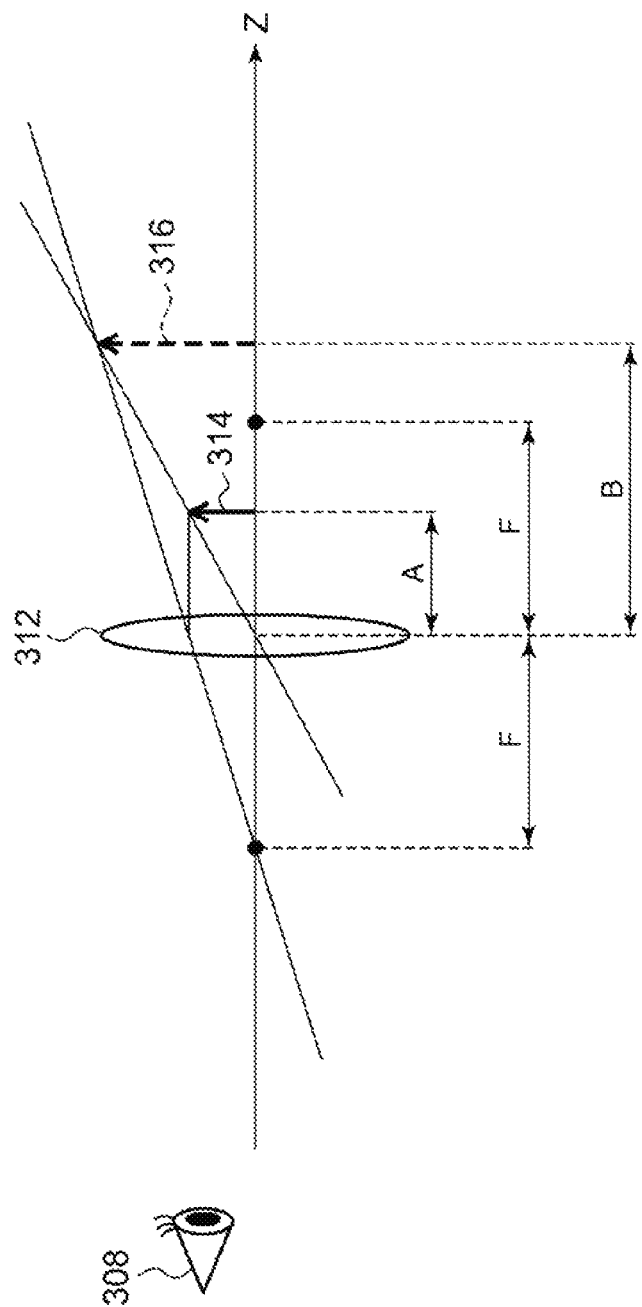
FIG. 3 is a diagram of assistance in explaining a lens formula for a convex lens.

FIG. 3 is a diagram of assistance in explaining a lens formula for a convex lens. More specifically, FIG. 3 is a diagram of assistance in explaining a relation between an object 314 and a virtual image 316 of the object 314 in a case where the object is present on the inside of the focal point of a convex lens 312. As shown in FIG. 3, a Z-axis is set in the direction of a line of sight of the viewpoint 308, and the convex lens 312 is disposed such that the optical axis of the convex lens 312 and the Z-axis coincide with each other on the Z-axis. The focal length of the convex lens 312 is F. The object 314 is disposed on an opposite side from the viewpoint 308 with respect to the convex lens 312 so as to be separated from the convex lens 312 by a distance A (A<F). That is, in FIG. 3, the object 314 is disposed on the inside of the focal point of the convex lens 312. In this case, when the object 314 is viewed from the viewpoint 308, the object 314 is observed as a virtual image 316 at a position separated from the convex lens 312 by a distance B (F<B).

In this case, relation between the distance A, the distance B, and the focal length F is defined by a known lens formula expressed by the following Equation (1):

$$1/A - 1/B = 1/F \quad (1)$$

In addition, a ratio of a size Q (length of a broken line arrow in FIG. 3) of the virtual image 316 to a size P (length of a solid line arrow in FIG. 3) of the object 314, that is, a magnification m=Q/P is expressed by the following Equation (2):

$$m = B/A \quad (2)$$

Equation (1) can also be regarded as indicating a relation to be satisfied by the distance A of the object 314 and the focal length F to present the virtual image 316 at the position separated from the convex lens 312 by the distance B on the opposite side from the viewpoint 308 with respect to the convex lens 312. Consideration will be given to a case where the focal length F of the convex lens 312 is fixed, for example. In this case, when Equation (1) is modified, the distance A can be expressed as in the following Equation (3) as a function of the distance B.

$$A(B) = FB/(F+B) = F/(1 + F/B) \quad (4)$$

Equation (4) indicates a position at which to dispose the object 314 to present the virtual image 316 at the position at the distance B when the focal length of the convex lens is F. As is clear from Equation (4), the larger the distance B, the larger the distance A.

In addition, when Equation (2) is modified by substituting Equation (1) in Equation (2), the size P to be assumed by the object 314 to present the virtual image 316 having the size Q at the position at the distance B can be expressed as in the following Equation (5):

$$P(B,Q) = Q*F/(B+F) \quad (5)$$

Equation (5) represents the size P to be assumed by the object 314 as a function of the distance B and the size Q of the virtual image 316. Equation (5) indicates that the larger the size Q of the virtual image 316, the larger the size P of the object 314. It is also indicated that the larger the distance B of the virtual image 316, the smaller the size P of the object 314.

Figure 4:
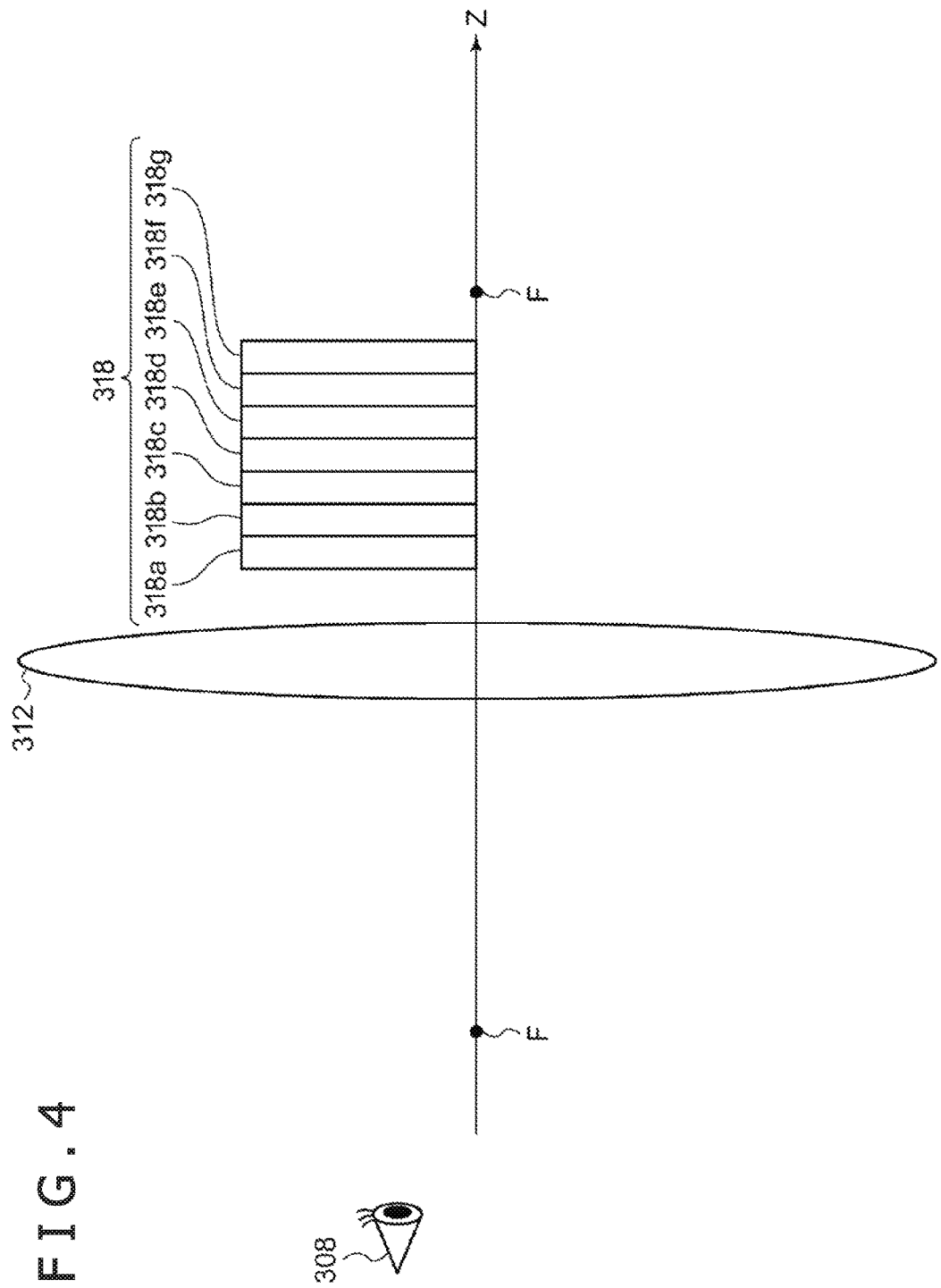
FIG. 4 is a diagram schematically showing an optical system provided to the HMD according to the embodiment.

FIG. 4 is a diagram schematically showing an optical system provided to the stereoscopic image presenting device 100 according to the embodiment. The stereoscopic image presenting device 100 includes a convex lens 312 and a plurality of transmissive display elements 318 within the casing 160. In FIG. 4, the stereoscopic image presenting device 100 includes seven transmissive display elements, that is, transmissive display elements 318a to 318g. The transmissive display elements 318a to 318g will hereinafter be described collectively as "transmissive display elements 318" unless particularly distinguished from each other.

Though not limited, each of the transmissive display elements 318a to 318g can be implemented by using transmissive organic electro-luminescence (EL), for example. While FIG. 4 illustrates a case where the stereoscopic image presenting device 100 includes seven transmissive display elements 318, the number of transmissive display elements 318 is not limited to seven. It suffices to provide at least two transmissive display elements 318.

As in the case shown in FIG. 3, also in FIG. 4, a Z-axis is set in the direction of the line of sight of the viewpoint 308, and a convex lens 312 is disposed such that the optical axis of the convex lens 312 and the Z-axis coincide with each other on the Z-axis. The focal length of the convex lens 312 is F. Two points F in FIG. 4 each represent the focal point of the convex lens 312. As shown in FIG. 4, each of the plurality of transmissive display elements 318 is disposed on the inside of the focal point of the convex lens 312 on an opposite side from the viewpoint 308 with respect to the convex lens 312. Hence, supposing that the thickness of one transmissive display element 318 is d, a maximum number of transmissive display elements 318 that can be arranged is [F/d]. Here, [ ] is Gauss' notation, and [x] denotes a maximum integer equal to or less than x.

Each of the transmissive display elements 318 can display a different image independently. The transmissive display elements 318 are a member capable of transmitting visible light. In addition, the plurality of transmissive display elements 318 are each provided side by side on the optical path of the stereoscopic image presenting device 100, that is, on the optical axis of the convex lens 312. Hence, even an image displayed by a transmissive display element 318 on a far side with respect to the viewpoint 308 passes through a transmissive display element 318 on a near side with respect to the viewpoint 308, and reaches the viewpoint 308. That is, the images displayed by the plurality of transmissive display elements 318 are observed in such a manner as to be superimposed on each other as viewed from the viewpoint 308.

In this case, as described above, the convex lens 312 is present between the viewpoint 308 and the transmissive display elements 318. Hence, when the transmissive display elements 318 are viewed from the viewpoint 308, the images displayed by the plurality of transmissive display elements 318 are observed as virtual images each in accordance with Equation (1) and Equation (2). In this sense, the convex lens 312 functions as an optical element that generates the respective virtual images of the images displayed by the plurality of transmissive display elements 318.

Figure 5:
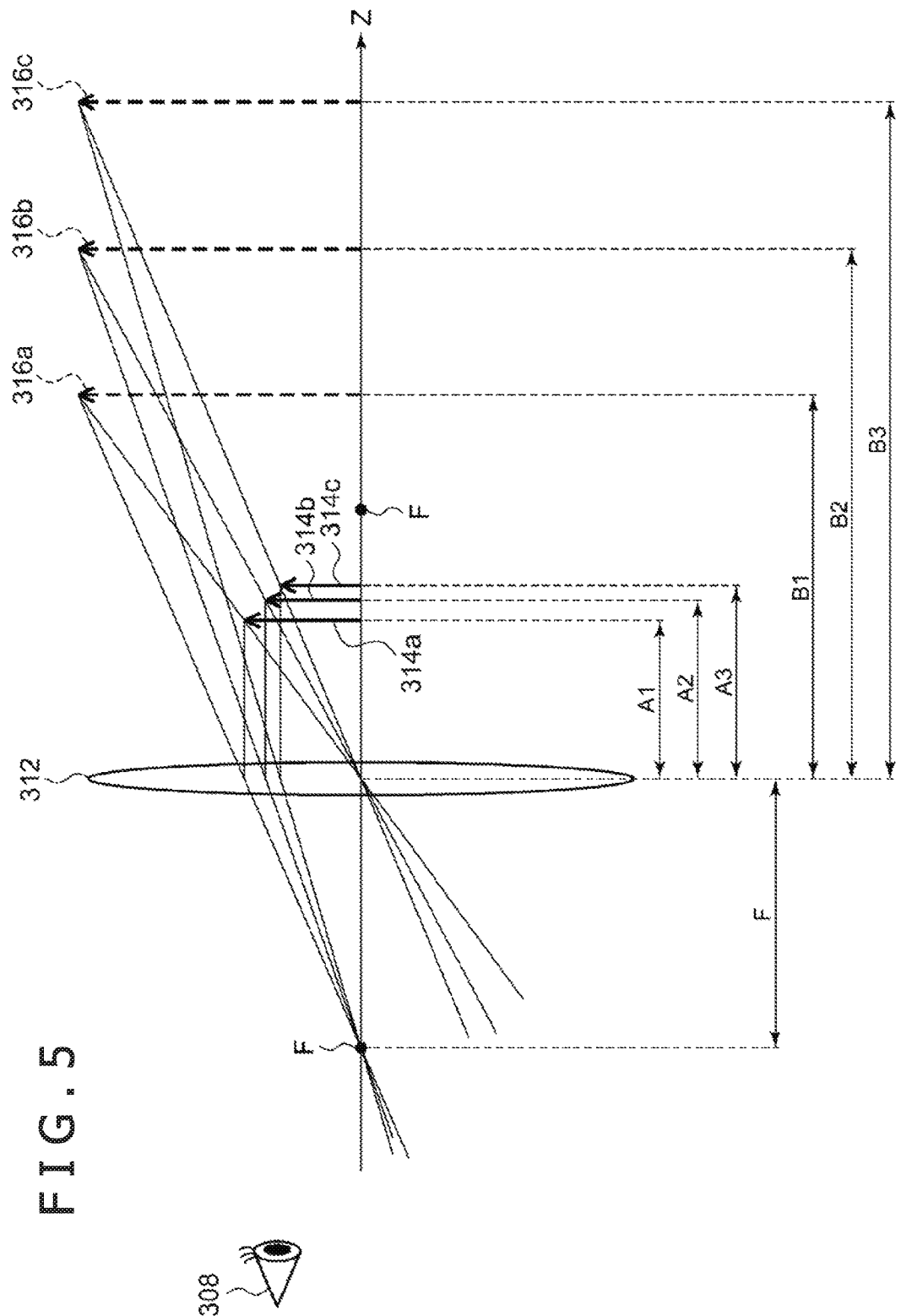
FIG. 5 is a diagram showing images to be displayed by transmissive display elements to present virtual images having a same size at different positions.

FIG. 5 is a diagram showing images to be displayed by transmissive display elements 318 to present virtual images having a same size at different positions. FIG. 5 shows an example in which three virtual images 316a, 316b, and 316c are presented in the same size Q at distances B1, B2, and B3 from the optical center of the convex lens 312. In addition, images 314a, 314b, and 314c in FIG. 5 correspond to the virtual images 316a, 316b, and 316c, respectively. The images 314a, 314b, and 314c are each displayed by one of the plurality of transmissive display elements 318. Incidentally, in relation to the lens formula shown in Equation (1), the object 314 in FIG. 3 corresponds to the images displayed by the transmissive display elements 318 in FIG. 5. Accordingly, the images in FIG. 5 are identified by the same reference symbol 314 as the object 314 in FIG. 3.

More specifically, the images 314a, 314b, and 314c are respectively displayed by transmissive display elements 318 located at positions separated from the optical center of the convex lens 312 by A1, A2, and A3. Here, from Equation (4), A1, A2, and A3 are given by the respective following Equations.

$$A1 = F/(1 + F/B1)$$

$$A2 = F/(1 + F/B2)$$

$$A3 = F/(1 + F/B3)$$

In addition, from Equation (5), sizes P1, P2, and P3 of the images 314a, 314b, and 314c to be displayed are given by the respective following Equations using the size Q of the virtual image 316.

$$P1 = Q*F/(B1 + F)$$

$$P2 = Q*F/(B2 + F)$$

$$P3 = Q*F/(B3 + F)$$

The position of the virtual image 316 presented to the user can be changed by thus changing the transmissive display element 318 made to display the image 314, or in other words, changing the position of the transmissive display element 318 made to display the image. In addition, the size of the virtual image 316 to be presented can also be controlled by changing the size of the image displayed on the transmissive display element 318.

The above description has been made of the relation between the position of the object 314 and the position of the virtual image 316 and the relation between the size of the object 314 and the size of the virtual image 316 in the case where the object 314 is located on the inside of the focal point F of the convex lens 312. Description will next be made of a functional configuration of the stereoscopic image presenting device 100 according to the embodiment. The stereoscopic image presenting device 100 according to the embodiment uses the above-described relations between the object 314 and the virtual image 316.

Figure 6:
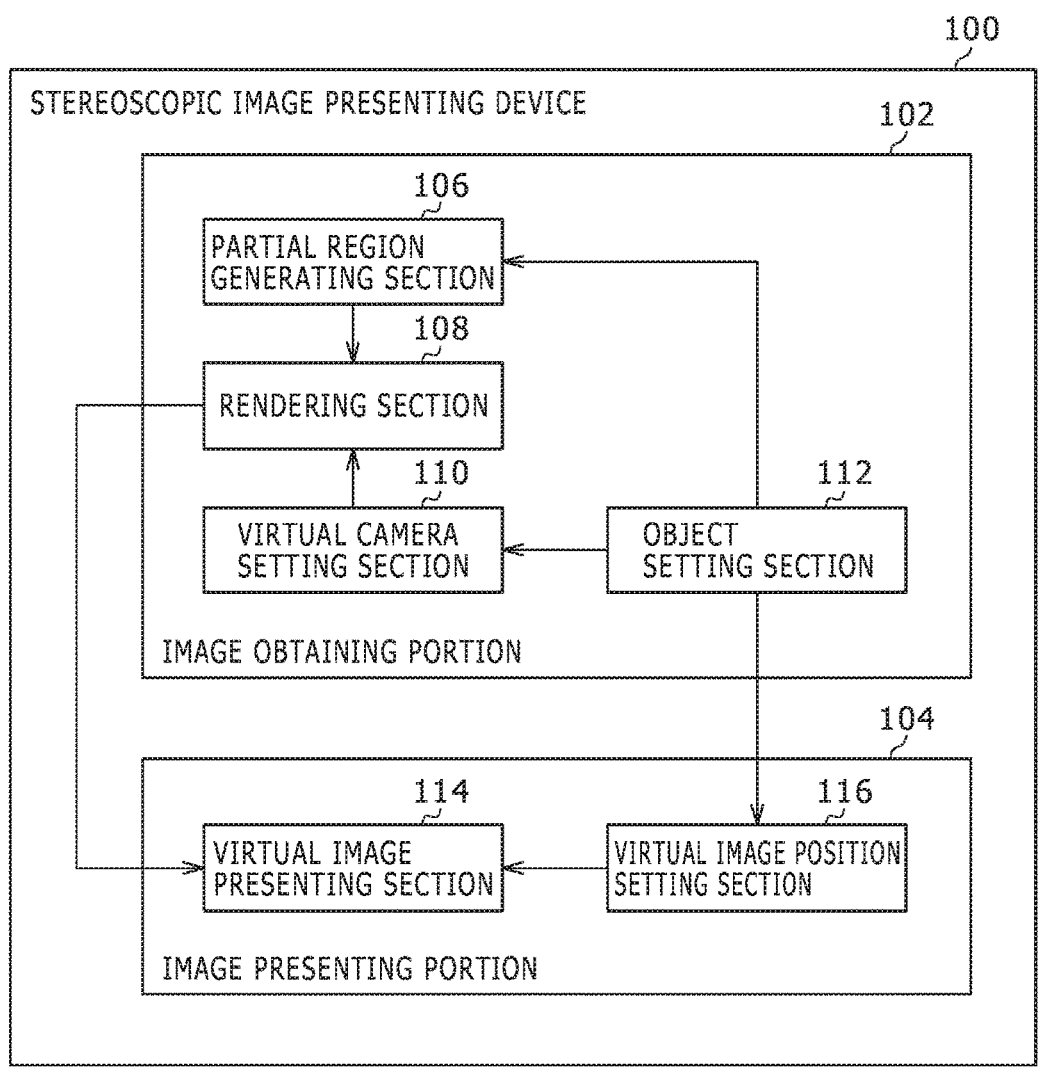
FIG. 6 is a diagram schematically showing a functional configuration of a stereoscopic image presenting device according to the embodiment.

FIG. 6 is a diagram schematically showing a functional configuration of the stereoscopic image presenting device 100 according to the embodiment. The stereoscopic image presenting device 100 includes an image obtaining portion 102 and an image presenting portion 104. FIG. 6 shows a functional configuration for implementing the stereoscopic image presenting device 100 according to the embodiment, but does not show other configurations. Elements described as functional blocks performing various processing in FIG. 6 can be configured by a CPU, a main memory, or another large scale integration (LSI) housed within the casing 160 of the stereoscopic image presenting device 100 in terms of hardware. In addition, the above-described elements are implemented by a program loaded in the main memory or the like in terms of software. Hence, it is to be understood by those skilled in the art that these functional blocks can be implemented in various forms, and are not limited to one of the forms.

The image obtaining portion 102 obtains an image to be presented by the stereoscopic image presenting device 100. The image obtaining portion 102 for example obtains an image of the virtual object 304 which image is photographed by the virtual camera 300 set in the virtual space. The image photographed by the virtual camera 300 in this case is a two-dimensional image obtained by two-dimensionally projecting the virtual object 304 having three-dimensional information. The image obtaining portion 102 is implemented by various kinds of modules implemented within the casing 160 of the stereoscopic image presenting device 100 described above with reference to FIG. 1. Details of the image obtaining portion 102 will be described later.

The image presenting portion 104 presents the image obtained by the image obtaining portion 102 in such a manner as to be superimposed on the real space observed by the user wearing the stereoscopic image presenting device 100. The image presenting portion 104 in this case presents, in the real space, the virtual image 316 of the image obtained by the image obtaining portion 102. The image presenting portion 104 is configured to be able to change the position of the virtual image 316 of the image which virtual image is presented in the real space. The image presenting portion 104 changes the position at which to present the virtual image 316 on the basis of depth information of the virtual object 304 appearing in the image presented to the user.

The "depth information" is for example information reflecting a sense of distance recognized by the user when an image showing a certain subject is presented to the user and the user views the subject. Therefore, an example of the "depth information" of the virtual object 304 includes a distance from the virtual camera 300 to the virtual object 304 when the virtual object 304 is photographed. In this case, the image presenting portion 104 changes the position at which to present the virtual image 316 of the image obtained by the image obtaining portion 102 on the basis of the distance from the virtual camera 300 to the virtual object 304 in the virtual space.

Specifically, in a case of a short distance from the virtual camera 300 to the virtual object 304 in the virtual space, the image presenting portion 104 presents the virtual image 316 of the image of the virtual object 304 at a near position as viewed from the user wearing the stereoscopic image presenting device 100 as compared with a case of a long distance from the virtual camera 300 to the virtual object 304 in the virtual space. In addition, the image presenting portion 104 generates the image 314 corresponding to the virtual image 316 according to the position of the virtual image 316 to be presented. In the following, more detailed description will be made of a method of generating the image 314 by the image obtaining portion 102 and a method of presenting the virtual image 316 by the image presenting portion 104.

As shown in FIG. 6, the image obtaining portion 102 includes a partial region generating section 106, a rendering section 108, a virtual camera setting section 110, and an object setting section 112. In addition, the image presenting portion 104 includes a virtual image presenting section 114 and a virtual image position setting section 116.

The object setting section 112 sets, within the virtual space, the virtual object 304 serving as a basis for the AR image to be presented to the user of the stereoscopic image presenting device 100. The virtual object 304 is for example constituted of three-dimensional voxel data. The object setting section 112 reads the voxel data of the virtual object 304 from a storage section, which is not shown, in the casing 160 of the stereoscopic image presenting device 100. Alternatively, the object setting section 112 may obtain the voxel data by radio communication from another apparatus present outside the stereoscopic image presenting device 100 via a Wi-Fi module, which is not shown, in the casing 160. The object setting section 112 may further set, within the virtual space, a virtual light source for illuminating the virtual object 304 set within the virtual space.

The virtual camera setting section 110 set, within the virtual space, the virtual camera 300 for observing the virtual object 304 set by the object setting section 112. Though not limited, the virtual camera setting section 110 may change the set position of the virtual camera 300 within the virtual space according to the movement of the imaging element 140 provided to the stereoscopic image presenting device 100.

In this case, the virtual camera setting section 110 detects the attitude and movement of the imaging element 140 on the basis of the output of various kinds of sensors such as the electronic compass, the acceleration sensor, and the inclination sensor included in the casing 160. The virtual camera setting section 110 changes the attitude and set position of the virtual camera 300 so as to follow the detected attitude and movement of the imaging element 140. Consequently, the appearance of the virtual object 304 as viewed from the virtual camera 300 can be changed so as to follow the movement of the head of the user wearing the stereoscopic image presenting device 100. This can more enhance the realism of the AR image presented to the user.

The partial region generating section 106 divides a processing target region including the virtual object 304 into a plurality of partial regions. The rendering section 108 generates an image of each of pieces of the virtual object 304 included in the plurality of partial regions which are generated by the partial region generating section 106, by rendering a part observable from the virtual camera 300.

FIGS. 7(a) and 7(b) are diagrams schematically showing an example of relation between a plurality of partial regions generated by the partial region generating section 106 according to the embodiment and a virtual object 304 included in each of the partial regions. FIGS. 7(a) and 7(b) show a state in which a spheroidal or egg-shaped virtual object 304 is delimited by seven partial regions 320a to 320g. The plurality of partial regions will hereinafter be referred to collectively as "partial regions 320" unless particularly distinguished from each other.

The partial region generating section 106 generates the partial regions 320 by dividing the virtual space according to the distance from the virtual camera 300 in the virtual space. Though not limited, the partial region generating section 106 sets a plurality of planes perpendicular to the optical axis of the virtual camera 300 (z-axis in FIG. 7) in the virtual space, and sets regions sandwiched between the planes adjacent to one another as the partial regions 320. For the convenience of description, the planes defining the partial regions 320 will hereinafter be described as "dividing planes." In FIG. 7, the partial region generating section 106 sets seven dividing planes, that is, dividing planes 322a to 322g, and generates seven partial regions 320a to 320g. Incidentally, as for the partial region 320g in FIG. 7, a space from the dividing plane 322g to an infinity is the partial region 320g.

FIG. 7(a) is a diagram showing a state in which the virtual object 304 is viewed from a direction perpendicular to the optical axis of the virtual camera 300, that is, a direction perpendicular to the xy plane of the virtual coordinate system 302 in FIG. 2. In addition, FIG. 7(b) is a diagram showing a state in which the virtual object 304 is viewed from a direction perpendicular to the xz plane of the virtual coordinate system 302 in FIG. 2.

As shown in FIG. 7(b), the virtual object 304 is divided into a plurality of pieces by the partial regions 320 generated by the partial region generating section 106. The rendering section 108 renders the virtual object 304, using, as a unit, each of the pieces of the virtual object 304 fragmented by the partial regions 320. More specifically, the rendering section 108 generates an image of each of the pieces of the fragmented virtual object 304 in a range viewed from the virtual camera 300.

Figure 7:
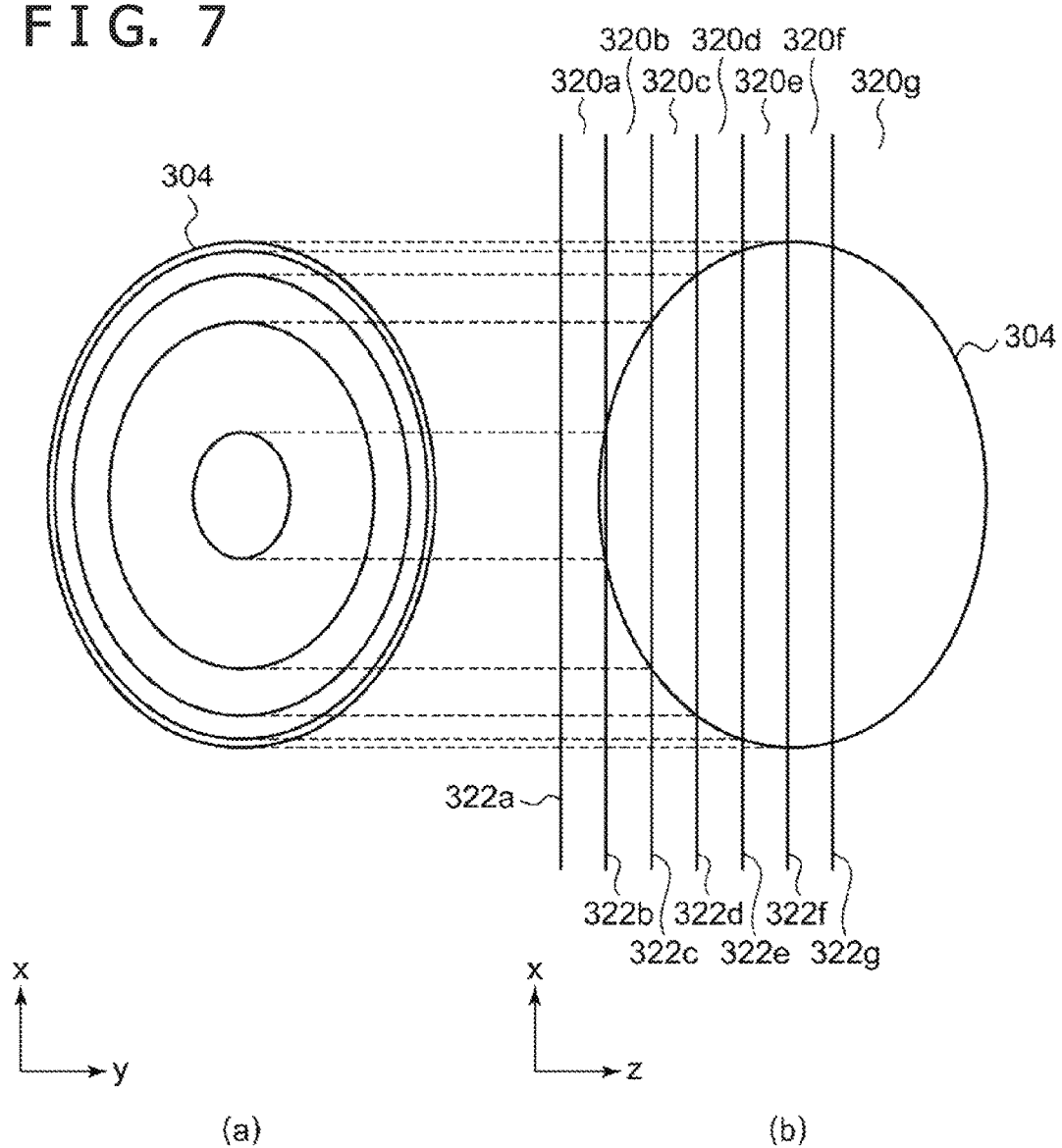
FIGS. 7(a) and 7(b) are diagrams schematically showing an example of relation between a plurality of partial regions generated by a partial region generating section according to the embodiment and a virtual object included in each of the partial regions.
Figure 8:
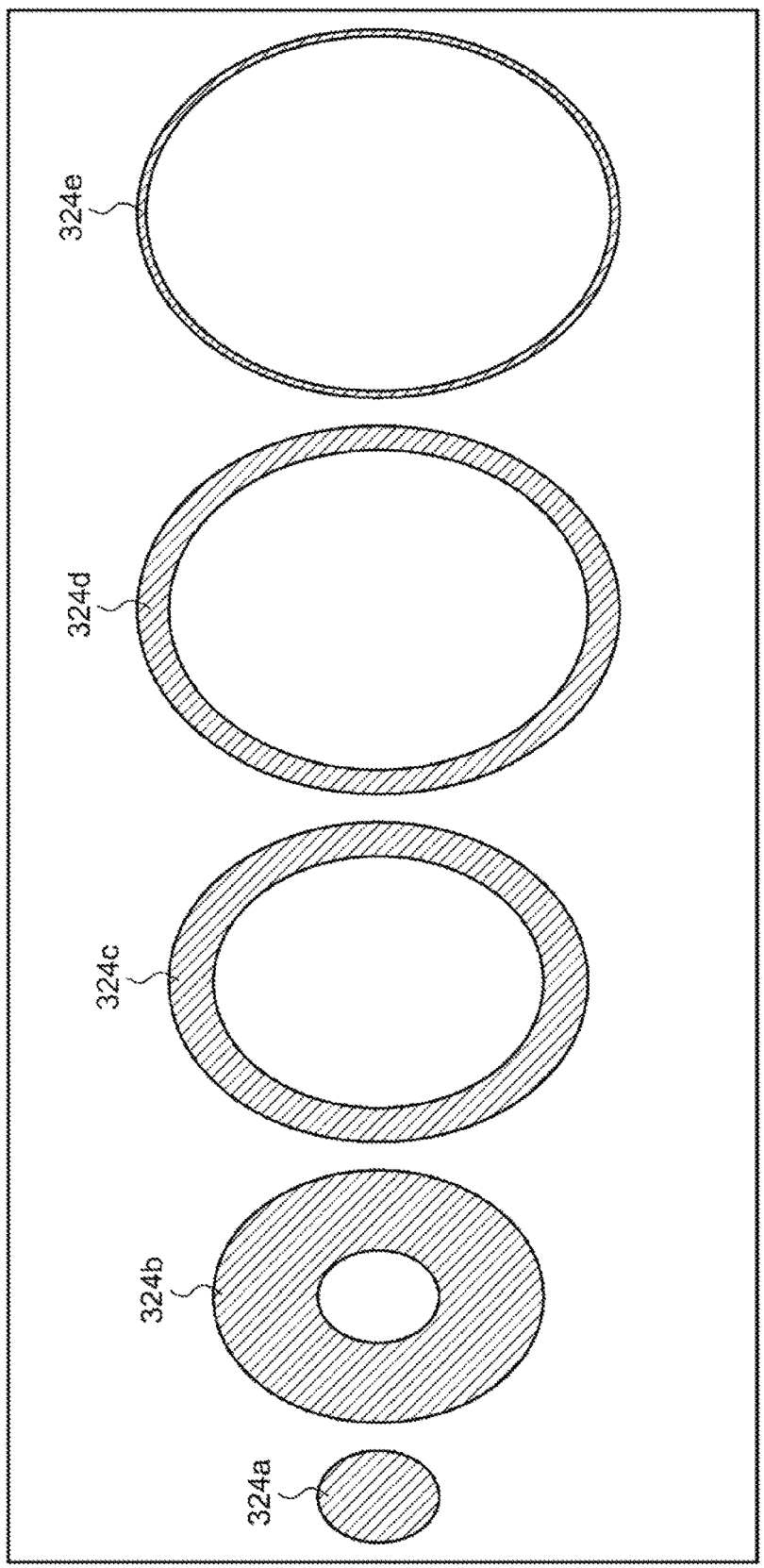
FIG. 8 is a diagram schematically showing an example of images generated by a rendering section according to the embodiment.

FIG. 8 is a diagram schematically showing an example of the images generated by the rendering section 108 according to the embodiment. FIG. 8 is a diagram showing the images generated when the rendering section 108 renders each of the pieces of the virtual object 304 shown in FIG. 7.

Images 324a to 324e in FIG. 8 are respectively obtained by rendering the pieces of the virtual object 304 which pieces are included in the partial regions 320a to 320e in FIG. 7. The partial region 320a in FIG. 7, for example, includes a part of the virtual object 304 which part is nearest to the virtual camera 300. The piece of the virtual object 304 which piece is included in the partial region 320a therefore appears to be elliptical as viewed from the virtual camera 300. The rendering section 108 accordingly generates an elliptical image 324e as represented by an image 324a in FIG. 8.

Similarly, the piece of the virtual object 304 which piece is included in the partial region 320b in FIG. 7 has an elliptical shape as viewed from the virtual camera 300. However, the piece of the virtual object 304 which piece is included in the partial region 320a is present between the piece of the virtual object 304 which piece is included in the partial region 320b and the virtual camera 300. Hence, a part observable from the virtual camera 300 in the piece of the virtual object 304 which piece is included in the partial region 320b has a doughnut type shape as represented by the image 324b in FIG. 8. The rendering section 108 accordingly generates the image 324b as an image of the piece of the virtual object 304 which piece is included in the partial region 320b. The images 324c to 324e are generated in a similar manner.

Incidentally, the pieces of the virtual object 340 which pieces are included in the partial region 320f and the partial region 320g in FIG. 7 are hidden by the virtual object 340 itself, and thus cannot be observed from the virtual camera 300. The rendering section 108 therefore does not generate images of the pieces of the virtual object 340 which pieces are included in the partial region 320f and the partial region 320g.

The description returns to FIG. 6. The virtual image position setting section 116 sets the position at which to present the virtual image 316 of the image generated by the rendering section 108 according to the distance from the virtual camera 300 to the partial region 320 in the virtual space. As described above with reference to FIG. 3, the position of the image 314 and the position of the virtual image 316 correspond to each other on a one-to-one basis. Hence, as indicated by Equation (4), the position at which to present the virtual image 316 can be controlled by changing the image 314 corresponding to the virtual image 316. The virtual image position setting section 116 therefore sets the position of the transmissive display element 318 to be made to display the image generated by the rendering section 108 according to the distance from the virtual camera 300 to the partial region 320 in the virtual space. More specifically, the virtual image position setting section 116 selects the transmissive display element 318 present at the position derived according to Equation (4).

For example, the virtual image position setting section 116 selects the transmissive display element 318a in FIG. 4 as the transmissive display element 318 to be made to display the image generated from the piece of the virtual object 304 which piece is included in the partial region 320a in FIG. 7. The virtual image position setting section 116 thereafter similarly selects the transmissive display elements 318b to 318g as the transmissive display elements 318 to be made to display the images obtained by rendering the virtual object 304 included in the partial regions 320b to 320g, respectively. The AR image can be presented more stereoscopically by thus setting the position at which to present the virtual image 316 of the image generated by the rendering section 108 according to the distance from the virtual camera 300 to the partial region 320 in the space. This is because, as viewed from the user, information in the depth direction of the virtual object 304 is reflected in the presented virtual image 316.

Incidentally, as shown in FIG. 7, the partial region 320g includes a space from the dividing plane 322g to an infinity. Hence, the rendering section 108, as it were, rounds the information in the depth direction of the virtual object 304 included in the partial region 320g, and generates the image. That is, the dividing plane 322 located at a most distant position from the virtual camera 300 in the virtual space defines a long distance from the virtual camera 300.

In the example shown in FIG. 7, the dividing plane 322g is a dividing plane most distant from the virtual camera 300. Accordingly, a distance between the dividing plane 322 located at the position most distant from the virtual camera 300 and the virtual camera 300 is set as a "remote reference distance." The partial region generating section 106 sets regions separated from the virtual camera 300 by more than the remote reference distance as one partial region, that is, a remote partial region. The dividing plane 322 located at the position most distant from the virtual camera 300 defines the remote reference distance. Therefore, the dividing plane 322 can also be said to be a "remote reference plane."

Incidentally, the remote reference distance is set by the partial region generating section 106. The partial region generating section 106 sets the remote reference plane at the position separated from the virtual camera 300 by the remote reference distance. The partial region generating section 106 divides a region nearer to the virtual camera 300 than the set remote reference plane into a plurality of partial regions 320. The rendering section 108 can thereby finely image the virtual object 304 present in the region nearer to the virtual camera 300 than the remote reference distance. That is, it is possible to improve the stereoscopic effect of the AR image derived from the virtual object 304 present in the region nearer to the virtual camera 300 than the distance.

Here, the partial region generating section 106 performs the division such that each of the plurality of partial regions 320 partly overlaps another partial region 320 or is at least in contact with another partial region 320. In addition, the partial region generating section 106 sets the dividing plane 322 nearest to the virtual camera 300 so as to be in contact with the virtual camera 300. The rendering section 108 can thereby render the virtual object 304 present in the virtual space without omission.

The functional configuration of the stereoscopic image presenting device 100 according to the embodiment has been described above. Description will next be made of an example of an application executed by the stereoscopic image presenting device 100.

The stereoscopic image presenting device 100 according to the embodiment can execute various applications using the CPU within the casing 160. A game application, for example, is cited as an example of such an application.

The game application typically includes an image of a character that can be operated by the user and other images. In a case of a racing game, for example, a vehicle operated by the user is the character, and a road, a vehicle of an opponent, and the like constitute a background, as it were. In game applications in recent years, it has been common practice to set, in the virtual space, a virtual object 304 for generating the character image and a virtual object 304 for generating the background image, and generate a projection image as viewed from the virtual camera 300. When the stereoscopic image presenting device 100 executes the program of the game application, the image obtaining portion 102 sets, in the virtual space, the virtual objects 304 of the character appearing in the game and the background, and generates an image of the virtual objects 304. The image presenting portion 104 presents a virtual image 316 of the image generated by the image obtaining portion 102 to the user of the stereoscopic image presenting device 100.

A virtual object 304 set in the virtual space by the object setting section 112 in the image obtaining portion 102 is given one or a plurality of attributes defining the characteristics of the virtual object 304. As an example of the attributes, there is for example an attribute indicating whether or not the character can be operated by the user. Other examples of the attributes include physical characteristics of the virtual object 304 in the virtual space, such as moving speed, acceleration, and degrees of reflection and absorption of light.

A virtual object 304 thus includes one or a plurality of attributes selected from a plurality of attributes set in advance. The partial region generating section 106 may change the method of dividing the partial regions 320 according to the attributes of the virtual object 304.

As described above, regions distant from the virtual camera 300 by more than the remote reference distance set by the partial region generating section 106 are collected into one partial region 320 as a remote region. Hence, virtual objects 304 present in the remote region are rendered in one image by the rendering section 108. A virtual image 316 of the image derived from the virtual objects 304 present in the remote region is therefore presented as an image lacking in perceived depth to the user.

It is considered that the character operated by the user in the game application draws a high degree of attention of the user. Therefore, if the virtual object 304 of the character operated by the user is included in the remote region, the virtual image 316 actually presented to the user may lack in perceived depth. Accordingly, when the virtual object 304 has the character attribute indicating the character that can be operated by the user, the partial region generating section 106 sets the remote reference distance such that the virtual object 304 is excluded from the remote partial region. Specifically, the partial region generating section 106 sets the remote reference plane at a same position as or a position more distant from a virtual object 304 present at a position most distant from the virtual camera 300 among virtual objects 304 having the character attribute. It is thereby possible to improve the stereoscopic effect of an AR image derived from at least the character operated by the user.

Figure 9:
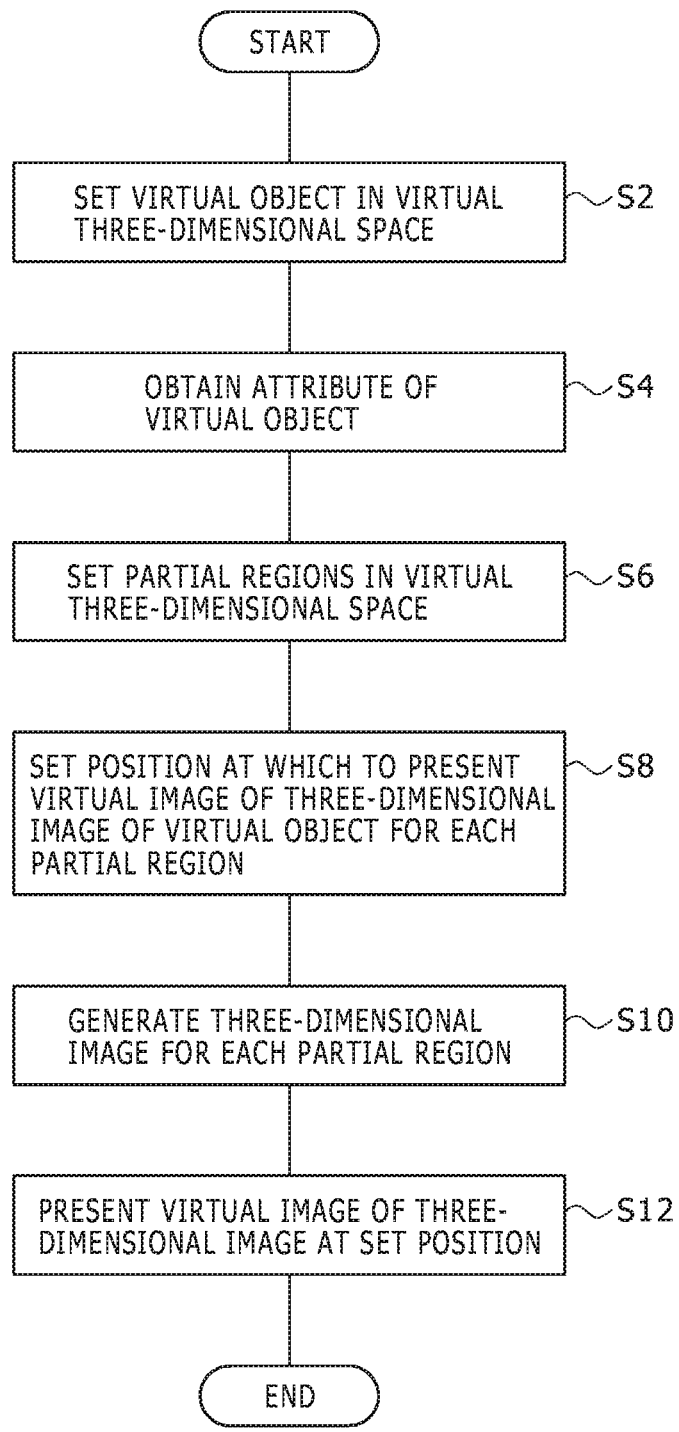
FIG. 9 is a flowchart of assistance in explaining a flow of stereoscopic image presentation processing performed by the stereoscopic image presenting device according to the embodiment.

FIG. 9 is a flowchart of assistance in explaining a flow of stereoscopic image presentation processing performed by the stereoscopic image presenting device 100 according to the embodiment. The processing in the present flowchart is started when a power supply of the stereoscopic image presenting device 100 is started, for example.

The object setting section 112 sets a virtual object 304 in the virtual space (S2). The partial region generating section 106 obtains an attribute provided to the virtual object 304 set by the object setting section 112 (S4). The partial region generating section 106 sets a plurality of partial regions 320 in the virtual space according to the obtained attribute of the virtual object 304 (S6).

The virtual image position setting section 116 sets a position at which to present a virtual image 316 of an image of the virtual object 304 for each of the partial regions 320 generated by the partial region generating section 106 (S8). The rendering section 108 generates an image of each of the partial regions 320 generated by the partial region generating section 106 by rendering a part of the virtual object 304 which part is included in the partial region 320 (S10). The virtual image presenting section 114 displays the image generated by the rendering section 108 on a transmissive display element 318 so that a virtual image 316 of the image generated by the rendering section 108 is presented at the position set by the virtual image position setting section 116 (S12).

After the virtual image presenting section 114 presents the virtual image 316, the processing in the present flowchart is ended.

As described above, the stereoscopic image presenting device 100 according to the embodiment can improve the stereoscopic effect of an AR image.

The present invention has been described above on the basis of an embodiment thereof. The embodiment is illustrative, and it is to be understood by those skilled in the art that combinations of constituent elements and processing processes of the embodiment are susceptible of various modifications and that such modifications also fall within the scope of the present invention.

(First Modification)

In the foregoing, description has been made of a case where the focal length of the convex lens 312 is fixed. Therefore, on the basis of Equation (1), the position of the virtual image 316 is controlled by changing the position of the transmissive display element 318. In place of this, the distance from the optical center of the convex lens 312 to the transmissive display element 318 may be fixed, and the focal length of the convex lens 312 may be changed. This can be achieved by using a liquid crystal lens whose focal length can be changed as the convex lens 312, for example. Alternatively, this can be achieved by adopting a constitution in which a plurality of lenses having focal lengths different from each other are interchanged. A stereoscopic image presenting device 100 in which the position of a transmissive display element 318 is fixed and which employs a convex lens 312 whose focal length is variable will be described as a first modification in the following.

Figure 10:
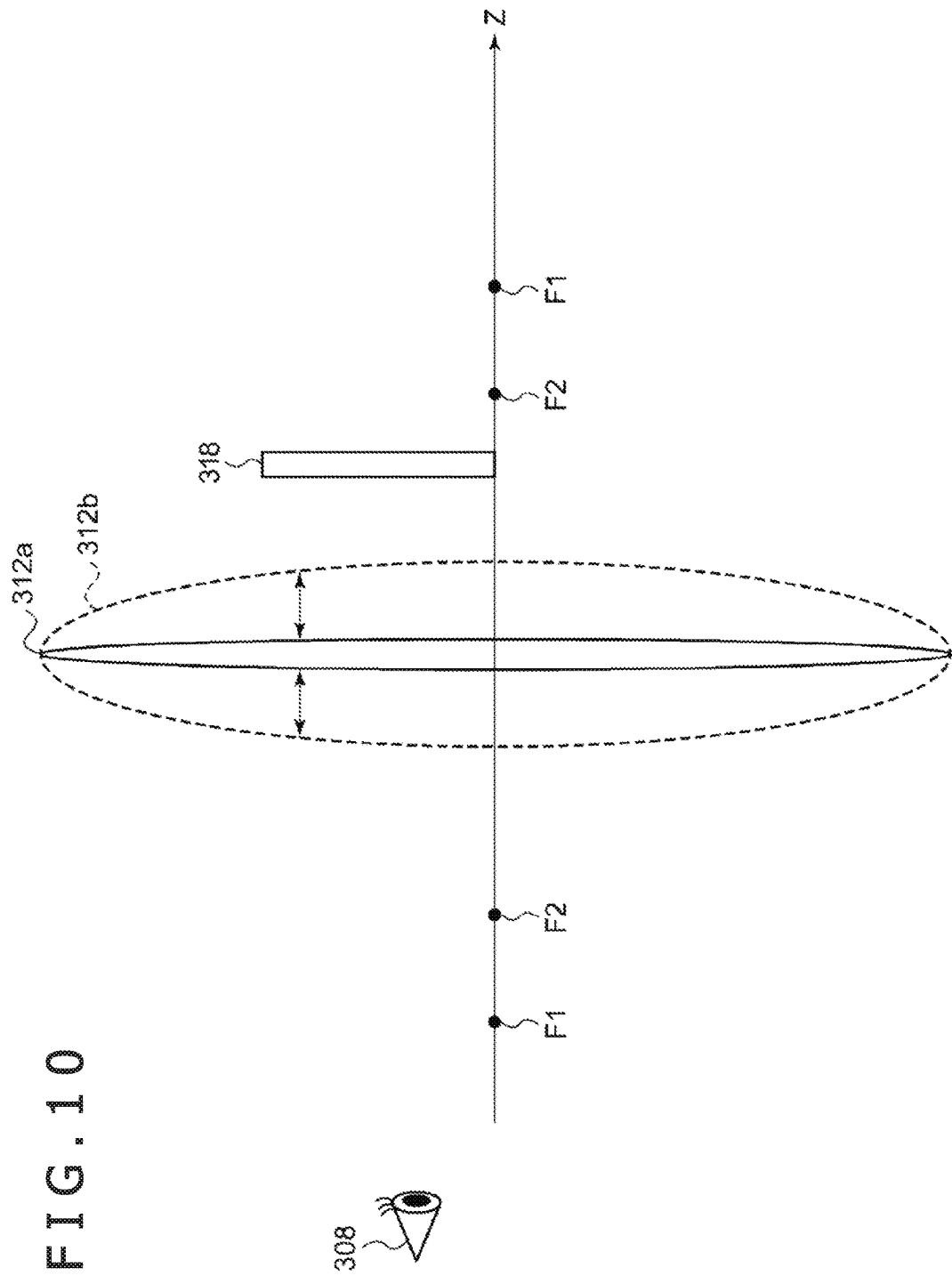
FIG. 10 is a diagram schematically showing a convex lens whose focal length is changeable and the focal length.

FIG. 10 is a diagram schematically showing a convex lens 312 whose focal length is changeable and the focal length. As shown in FIG. 10, the convex lens 312 has a focal length freely changeable in a range of F1 to F2. For example, in FIG. 10, the focal length is F1 in a state of a convex lens 312a represented by a solid line. In addition, the focal length is F2 in a state of a convex lens 312b represented by a broken line. Incidentally, while FIG. 10 shows the thickness of the convex lens 312 changing for the convenience of description, the thickness itself of the convex lens 312 is not necessarily changed. For example, the focal length can also be changed by changing the orientation of a liquid crystal having birefringence.

Suppose that, in Equation (1), the distance A is fixed and the focal length F is variable. In this case, when Equation (1) is modified, the following Equation (6) having the focal length F as a function of the distance B is obtained.

$$F(B)=A/(1-A/B) \tag{6}$$

Equation (6) indicates a value to be satisfied by the focal length F when a certain distance B is given. Equation (6) shows that the longer the distance B, the larger the focal length F.

In addition, a size P to be assumed by an object 314 to present a virtual image 316 having a size Q at a position at the distance B is the same as in Equation (5) described above.

Figure 11:
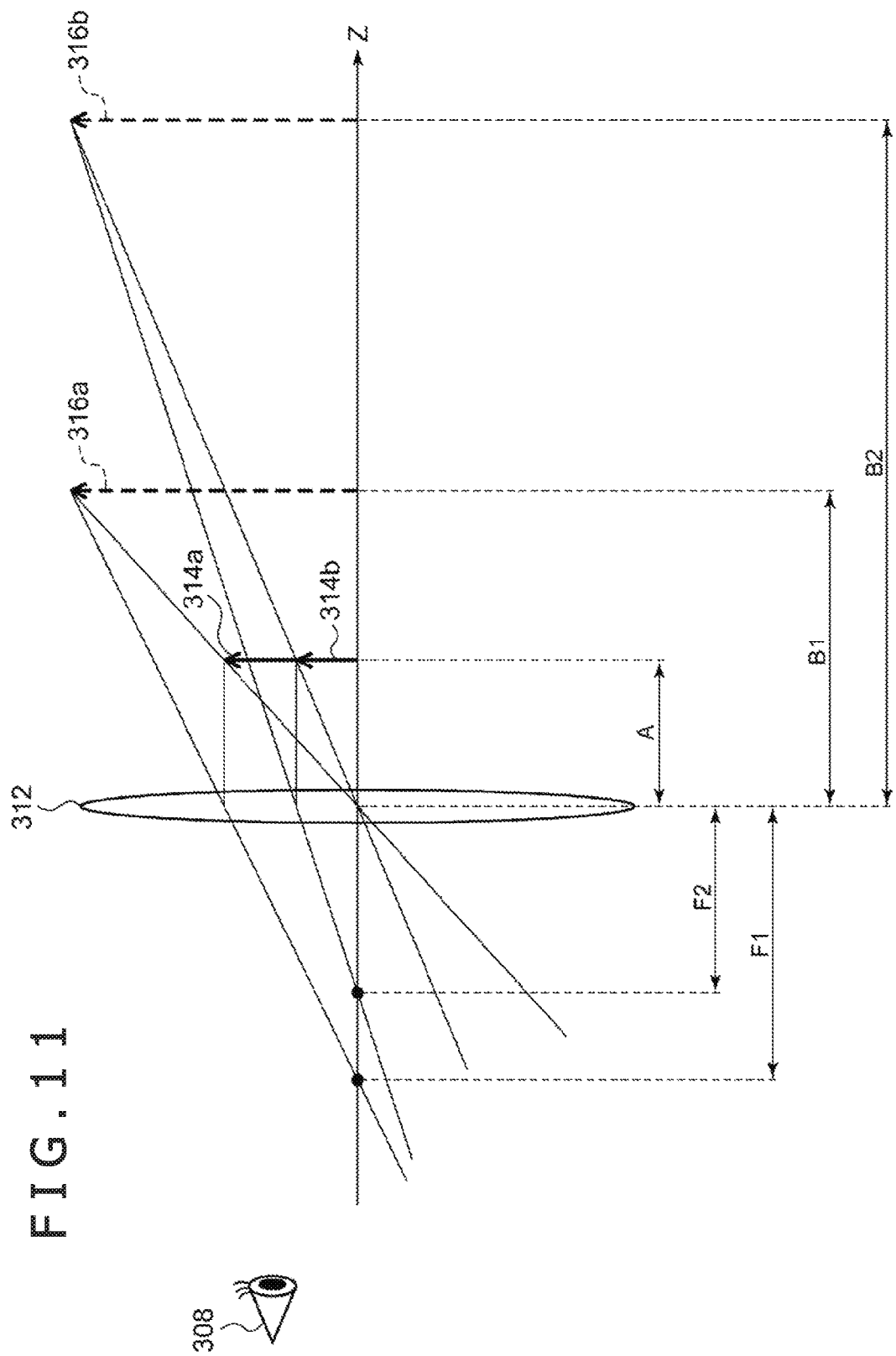
FIG. 11 is a diagram showing positions at which the focal point of the convex lens is to be located to present virtual images having a same size at different positions.

FIG. 11 is a diagram showing positions at which the focal point F of the convex lens 312 is to be located to present virtual images 316 having a same size at different positions. FIG. 11 shows an example in which two virtual images 316a and 316b are presented in the same size Q at a distance B1 and a distance B2, respectively, from the optical center of the convex lens 312. In addition, in FIG. 11, an image 314a and an image 314b correspond to the virtual image 316a and the virtual image 316b, respectively. The image 314a and the image 314b are displayed by an identical transmissive display element 318.

More specifically, the image 314a and the image 314b are both displayed by a transmissive display element 318 present at a position separated from the optical center of the convex lens 312 by a distance A. In this case, the positions at which the focal point F of the convex lens 312 is to be located, that is, the focal length F1 and the focal length F2 are given by the respective following Equations.

$$F1=A/(1-A/B1)$$

$$F2=A/(1-A/B2)$$

In addition, from Equation (5), sizes P1 and P2 of the image 314a and the image 314b to be displayed are given by the respective following Equations using the size Q of the virtual image 316.

$$P1=Q*F/(B1+F)$$

$$P2=Q*F/(B2+F)$$

Thus changing the focal length of the convex lens 312 can change the position of the virtual image 316 presented to the user. In addition, the size of the virtual image 316 to be presented can be controlled by changing the size of the image displayed on the transmissive display element 318. In this case, images 314 derived from a virtual object 304 included in respective partial regions 320 are displayed in order on a time-division basis. The user can stereoscopically observe the virtual images 316 due to persistence of vision of the user.

Incidentally, chromatic aberration and differences in luminance occur in a case where an optical element having a polarizing property such as a liquid crystal lens is used.

Accordingly, the rendering section 108 desirably generates images with the polarizing property taken into consideration.

(Second Modification)

Description has been made of a case where the stereoscopic image presenting device 100 according to the embodiment described above changes the display position of the image 314 by selecting a transmissive display element 318 to display the image 314 from among the plurality of transmissive display elements 318. In place of this, the physical position of the transmissive display element 318 that displays the image 314 may be changed by moving the transmissive display element 318. A stereoscopic image presenting device 100 in a case where the physical position of the transmissive display element 318 is changed will be described as a second modification in the following.

FIGS. 12(a) and 12(b) are diagrams schematically showing optical systems of the stereoscopic image presenting device 100 according to the second modification. The example shown in FIG. 12(a) and the example shown in FIG. 12(b) both include one transmissive display element 318. This transmissive display element 318 can move between transmissive display elements 318a and 318b shown in FIG. 12(a) and FIG. 12(b) along the optical axis of a convex lens 312. This can be achieved by moving the transmissive display element 318 using a motor not shown in the figures which motor is included within the casing 160 of the stereoscopic image presenting device 100, for example.

In the example shown in FIG. 12(a), as in the example shown in FIG. 4, the transmissive display element 318 is disposed on an opposite side from a viewpoint 308 with respect to the convex lens 312. On the other hand, in the example shown in FIG. 12(b), an optical element 326 such as a hologram is provided in place of the convex lens 312. When the optical element 326 receives light of an image displayed by the transmissive display element 318, the optical element 326 can present a virtual image obtained by enlarging the image displayed by the transmissive display element 318 to a viewpoint 308.

(Third Modification)

Description has been made of a case where the stereoscopic image presenting device 100 according to the second modification described above changes the position of the virtual image 316 by changing the physical position of the transmissive display element 318 that displays the image 314. In place of this, the position of the transmissive display element 318 may be fixed, and the lens may be moved. A stereoscopic image presenting device 100 in a case where the physical position of the lens is changed will be described as a third modification in the following.

FIGS. 13(a) and 13(b) are diagrams schematically showing optical systems of the stereoscopic image presenting device 100 according to the third modification. In both of the example shown in FIG. 13(a) and the example shown in FIG. 13(b), as in the examples shown in FIGS. 12(a) and 12(b), the stereoscopic image presenting device 100 includes one transmissive display element 318.

In the example shown in FIG. 13(a), as in the examples shown in FIG. 4 and FIG. 12(a), the stereoscopic image presenting device 100 includes one convex lens 312. In the example shown in FIG. 13(a), a motor not shown in the figures which motor is included within the casing 160 of the stereoscopic image presenting device 100 moves the convex lens 312 along the optical axis of the convex lens 312. Specifically, the motor can move the convex lens 312 between convex lenses 312a and 312b shown in FIG. 13(a).

It is thereby possible to change a relative distance between the convex lens 312 and the transmissive display element 318. The position of a virtual image 316 presented to a viewpoint 308 can therefore be changed.

In the example shown in FIG. 13(b), the stereoscopic image presenting device 100 includes a concave lens 328 and a collimator lens 330. A motor not shown in the figures which motor is included within the casing 160 of the stereoscopic image presenting device 100 moves the concave lens 328 along the optical axis of the concave lens 328. Specifically, the motor can move the concave lens 328 between concave lenses 328a and 328b shown in FIG. 13(b). Thereby, the position of a virtual image presented to a viewpoint 308 can be changed.

(Fourth Modification)

The stereoscopic image presenting device 100 according to the second modification and the stereoscopic image presenting device 100 according to the third modification described above are both an example in which either the transmissive display element 318 or the lens such as the convex lens 312 is moved to thereby change the relative distance between the transmissive display element 318 and the lens. In place of this, a plurality of sets of transmissive display elements 318 and convex lenses 312 may be prepared, and a virtual image 316 may be presented while these sets are selected. Alternatively, an optical element having a changeable index of refraction may be inserted between the convex lens 312 and the transmissive display element 318 to make an optical path length between the convex lens 312 and the transmissive display element 318 variable.

FIGS. 14(a) and 14(b) are diagrams schematically showing optical systems of a stereoscopic image presenting device 100 according to a fourth modification.

The example shown in FIG. 14(a) represents an example of a stereoscopic image presenting device 100 including a plurality of sets of convex lenses 312 and transmissive display elements 318 which sets have different distances between the convex lenses 312 and the transmissive display elements 318. In the example shown in FIG. 14(a), the stereoscopic image presenting device 100 includes three sets, that is, a set of a convex lens 312a and a transmissive display element 318a, a set of a convex lens 312b and a transmissive display element 318b, and a set of a convex lens 312c and a transmissive display element 318c. The stereoscopic image presenting device 100 shown in FIG. 14(a) further includes a half-silvered mirror 332 connected to a motor not shown in the figures. The stereoscopic image presenting device 100 rotates the half-silvered mirror 332 by controlling the motor. The stereoscopic image presenting device 100 can thereby present a virtual image 316 of an image 314 displayed by one of the transmissive display elements 318 to a viewpoint 308. Because the sets of the convex lenses 312 and the transmissive display elements 318 have respective different distances between the convex lenses 312 and the transmissive display elements 318, the stereoscopic image presenting device 100 can change the position of the virtual image 316 presented to the viewpoint 308.

FIG. 14(b) shows an example of the stereoscopic image presenting device 100 including an optical element 334 having a changeable index of refraction between a convex lens 312 and a transmissive display element 318. By changing the index of refraction of the optical element 334, the stereoscopic image presenting device 100 shown in FIG. 14(b) changes an optical distance between the convex lens 312 and the transmissive display element 318 even though a physical distance between the convex lens 312 and the transmissive display element 318 is fixed. The stereoscopic image presenting device 100 can thereby change the position of a virtual image 316 of an image 314 presented to a viewpoint 308.

(Fifth Modification)

In the foregoing, description has been made of a case where the position of the transmissive display element 318 is changed to change the position of the virtual image 316 of the image 314 presented to the viewpoint 308. In place of this, the transmissive display element 318 may be moved to improve apparent resolution of the transmissive display element 318. In this case, a driving section not shown in the figures in the stereoscopic image presenting device 100 shifts the transmissive display element 318 in a direction of being offset from the optical axis by for example half a pixel or ¼ of a pixel in each frame of the image displayed by the transmissive display element 318. Operatively associated with this, the virtual camera setting section 110 shifts the position of the virtual camera 300 installed in the virtual space. Thus, the apparent resolution of the virtual image 316 presented to the user of the stereoscopic image presenting device 100 can be improved due to an effect of so-called "involuntary eye movement."

(Sixth Modification)

In the foregoing, description has been made of a case where the device that displays the image generated by the rendering section 108 is the transmissive display element 318. However, when the stereoscopic image presenting device 100 includes only one display device, the display device may be a non-transmissive display device such as a liquid crystal monitor rather than a transmissive display device, for example.

(Seventh Modification)

Description has been made of a case where the stereoscopic image presenting device 100 according to the foregoing embodiment executes the game application by the CPU provided in the casing 160. In place of this, or in addition to this, the stereoscopic image presenting device 100 may be connected to an external apparatus (for example a game console) by radio or wire, and function as an output device for the apparatus.

(Eighth Modification)

In the foregoing, description has been made of a case where the stereoscopic image presenting device 100 displays an AR image in a superimposed manner in the real space. For this purpose, on the basis of the depth information of the virtual object 304 appearing in the image to be presented to the user, the image presenting portion 104 changes the position at which to present the virtual image of that image. However, as described above, the "depth information" is for example information reflecting a sense of distance recognized by the user when an image showing a certain subject is presented to the user and the user views the subject. Hence, the subject appearing in the image as a display object is not limited to the virtual object 304, and the present invention is also applicable to stereoscopic video, such as a 3D movie, for example, in which an actually existing object is set as a subject and is photographed by an actually existing camera. In this sense, the "object" includes not only virtual objects but also actually existing subjects, and can also be said to be a "rendering object" of the stereoscopic image presenting device 100.

The following description will be made supposing that the stereoscopic video is video including a parallax image for a left eye and a parallax image for a right eye.

The parallax image for the left eye and the parallax image for the right eye are a set of images obtained by photographing a same subject from respective different directions or angles. The parallax image for the left eye and the parallax image for the right eye are obtained by photographing the same subject, but are obtained from different observation points. Thus, the directions or angles in or at which the subject appears in the respective images are different from each other. This difference is known as "binocular parallax." The magnitude of binocular parallax changes according to distance from the observation points to the subject. That is, the set of the parallax image for the left eye and the parallax image for the right eye includes the depth information of the subject. A technology is known which obtains the depth information of the subject photographed in the parallax images by analyzing the binocular parallax of the parallax images.

Accordingly, the image presenting portion 104 may obtain the depth information of an object appearing in stereoscopic video by analyzing binocular parallax included in the stereoscopic video. Specifically, the object setting section 112 obtains the depth information of the object included in the stereoscopic video on the basis of a parallax image for the left eye and a parallax image for the right eye which parallax images are included in the stereoscopic video. More specifically, the object setting section 112 obtains the depth information for each pixel of the parallax images included in the stereoscopic video. The depth information obtained for each pixel by the object setting section 112 is information reflecting a distance between the object represented by each pixel and a camera that photographed the object.

The partial region generating section 106 divides the stereoscopic video to be processed into a plurality of partial regions on the basis of the depth information obtained by the object setting section 112. The rendering section 108 generates video constituted of pixels included in each of the plurality of partial regions generated by the partial region generating section 106.

The virtual image position setting section 116 sets a position at which to present a virtual image 316 of the image generated by the rendering section 108 on the basis of the depth information obtained by the object setting section 112. That is, the virtual image position setting section 116 sets the position of the transmissive display element 318 to be made to display the image generated by the rendering section 108 on the basis of the depth information obtained by the object setting section 112. When the depth information obtained by the object setting section 112 indicates a long distance from the user, the virtual image position setting section 116 sets the position of the transmissive display element 318 to a position distant from the eyes of the user as compared with a case where the depth information obtained by the object setting section 112 indicates a short distance. Because the depth information of the subject is reflected in the presentation position of the virtual image of the image including the subject, the stereoscopic effect of the stereoscopic video presented to the user can be improved.

Incidentally, in a case where the depth information is stored so as to be tied to each frame constituting the stereoscopic video, for example, at a time of photographing the stereoscopic video or the like, the rendering section 108 and the virtual image position setting section 116 may use the stored depth information. This can be achieved by measuring a three-dimensional position of the subject using a known three-dimensional position measuring device at the time of photographing the subject, for example. The post-analysis of the parallax images can be omitted, which is effective in that processing speed and power consumption can be reduced. There is another advantage in that depth information more accurate than the depth information obtained by the post-calculation is obtained.

It is to be noted that new embodiments obtained by combining the embodiment or each modification described above are also included in embodiments of the present invention. For example, the embodiment and the second modification may be combined with each other to construct a stereoscopic image presenting device 100 that includes a plurality of transmissive display elements 318 and which includes a movable convex lens 312.

REFERENCE SIGNS LIST

100 Stereoscopic image presenting device, 102 Image obtaining portion, 104 Image presenting portion, 106 Partial region generating section, 108 Rendering section, 110 Virtual camera setting section, 112 Object setting section, 114 Virtual image presenting section, 116 Virtual image position setting section, 120 Presenting section, 140 Imaging element, 160 Casing, 220 Partial region, 314 Image, 316 Virtual image, 318 Transmissive display element, 320 Partial region, 326 Optical element, 334 Optical element.

INDUSTRIAL APPLICABILITY

The present invention is applicable to a technology for presenting a stereoscopic image.

The invention claimed is:

1. A stereoscopic image presenting device comprising:
an image obtaining portion configured to obtain an image to be presented; and
an image presenting portion configured to present a virtual image of the image obtained by the image obtaining portion to a field of view of a user of the stereoscopic image presenting device;
the image presenting portion being configured to be able to change a position of the virtual image presented to the user, and changing the position at which the virtual image is presented on a basis of depth information of an object appearing in the image,
wherein the depth information of the object includes a distance from a camera photographing the object to the object,
wherein the depth information of the object includes a distance from a camera photographing the object to the object,
wherein, in a case of a short distance from the camera to the object, the image presenting portion presents the virtual image at a near position to the user as compared with a case of a long distance from the camera to the object,
wherein the image obtaining portion includes
wherein a partial region generating section configured to divide a processing target including the object into a plurality of partial regions,
wherein a rendering section configured to generate an image of each of pieces of the object, the pieces of the object being included in the plurality of partial regions by rendering a part observable from the camera, and
wherein the image presenting portion includes a virtual image position setting section configured to set positions at which to present virtual images of the images generated by the rendering section according to distances from the camera to the partial regions.

2. The stereoscopic image presenting device according to claim 1, wherein
the partial region generating section sets a remote reference distance defining a long distance from the camera, and sets regions located at positions separated from the camera by more than the remote reference distance in one partial region as a remote partial region.

3. The stereoscopic image presenting device according to claim 2, wherein
the object and the camera are respectively a virtual object and a virtual camera set in a virtual three-dimensional space,
the object has one or a plurality of attributes selected from a plurality of predetermined attributes, and
the partial region generating section changes a dividing method according to the attributes of the object.

4. The stereoscopic image presenting device according to claim 1, wherein the partial region generating section performs division such that each of the plurality of partial regions partly overlaps another partial region, or is in contact with another partial region.

5. The stereoscopic image presenting device according to claim 1, wherein the camera is a virtual camera.

6. The stereoscopic image presenting device according to claim 5, wherein the object is a virtual object.

7. The stereoscopic image presenting device according to claim 5, wherein the virtual camera position within a virtual space is changed according to actual movement of an imaging element in the stereoscopic image presenting device.

8. A stereoscopic image presenting device comprising:
an image obtaining portion configured to obtain an image to be presented; and
an image presenting portion configured to present a virtual image of the image obtained by the image obtaining portion to a field of view of a user of the stereoscopic image presenting device;
the image presenting portion being configured to be able to change a position of the virtual image presented to the user, and changing the position at which the virtual image is presented on a basis of depth information of an object appearing in the image,
wherein the depth information of the object includes:
a distance from a camera photographing the object to the object, and
in a case of a short distance from the camera to the object, the image presenting portion presents the virtual image at a near position to the user as compared with a case of a long distance from the camera to the object,
wherein the image obtaining portion includes:
a partial region generating section configured to divide a processing target including the object into a plurality of partial regions, wherein the partial region generating section sets a remote reference distance defining a long distance from the camera, and sets regions located at positions separated from the camera by more than the remote reference distance in one partial region as a remote partial region, and
a rendering section configured to generate an image of each of pieces of the object, the pieces of the object being included in the plurality of partial regions by rendering a part observable from the camera, and
the image presenting portion includes:
a virtual image position setting section configured to set positions at which to present virtual images of the images generated by the rendering section according to distances from the camera to the partial regions, wherein the object and the camera are respectively a virtual object and a virtual camera set in a virtual three-dimensional space, the object has one or a plurality of attributes selected from a plurality of predetermined attributes, and the partial region generating section changes a dividing method according to the attributes of the object, wherein the plurality of predetermined attributes include a character attribute, and the character attribute indicates that an object having the attribute is a character that the user can operate, and when the object has the character attribute, the partial region generating section sets the remote reference distance such that the object is excluded from the remote partial region.

9. A stereoscopic image presenting method performed by a processor of a stereoscopic image presenting device, the image presenting method comprising:

obtaining an image of an object to be presented;

setting a position at which to present a virtual image of the image on a basis of depth information of the object; and presenting the virtual image at the set position, wherein the depth information of the object includes a distance from a camera photographing the object to the object, wherein the depth information of the object includes a distance from a camera photographing the object to the object, wherein, in a case of a short distance from the camera to the object, the presenting presents the virtual image at a near position to the user as compared with a case of a long distance from the camera to the object, wherein the obtaining includes wherein a partial region generating step divides a processing target including the object into a plurality of partial regions, wherein a rendering step generates an image of each of pieces of the object, the pieces of the object being included in the plurality of partial regions by rendering a part observable from the camera, and wherein the presenting includes setting positions at which to present virtual images of the images generated by the rendering section according to distances from the camera to the partial regions.

10. A head-mounted display for presenting a stereoscopic image, the head-mounted display comprising:

an image obtaining portion configured to obtain an image to be presented; and an image presenting portion configured to present a virtual image of the image obtained by the image obtaining portion to a user wearing the head-mounted display, the image presenting portion being configured to be able to change a position of the virtual image presented to the user, and changing the position at which the virtual image is presented on a basis of depth information of an object appearing in the image, wherein the depth information of the object includes a distance from a camera photographing the object to the object;

the image presenting portion including a plurality of transmissive display sections configured to display the image, and an optical element configured to generate the virtual image of the image displayed by each of the plurality of transmissive display sections, the plurality of transmissive display sections being provided side by side on an optical path of the image presenting portion, and the optical element being provided between an eye of the user and the plurality of transmissive display sections in the optical path of the image presenting portion, wherein the depth information of the object includes a distance from a camera photographing the object to the object, wherein, in a case of a short distance from the camera to the object, the image presenting portion presents the virtual image at a near position to the user as compared with a case of a long distance from the camera to the object, wherein the image obtaining portion includes wherein a partial region generating section configured to divide a processing target including the object into a plurality of partial regions, wherein a rendering section configured to generate an image of each of pieces of the object, the pieces of the object being included in the plurality of partial regions by rendering a part observable from the camera, and wherein the image presenting portion includes a virtual image position setting section configured to set positions at which to present virtual images of the images generated by the rendering section according to distances from the camera to the partial regions.

\* \* \* \* \*